(12) United States Patent
Shinjo et al.

(10) Patent No.: US 7,297,194 B2
(45) Date of Patent: Nov. 20, 2007

(54) INK JET INK AND INK JET RECORDING METHOD

(75) Inventors: Kenji Shinjo, Yokohama (JP); Koromo Shirota, Kawasaki (JP); Yutaka Kurabayashi, Tokyo (JP); Minako Kawabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/219,807

(22) Filed: Sep. 7, 2005

(65) Prior Publication Data

US 2005/0284332 A1    Dec. 29, 2005

Related U.S. Application Data

(63) Continuation of application No. PCT/JP2005/005309, filed on Mar. 16, 2005.

(30) Foreign Application Priority Data

| Mar. 16, 2004 | (JP) | ............................. 2004-075391 |
| Mar. 16, 2004 | (JP) | ............................. 2004-075392 |
| Oct. 1, 2004  | (JP) | ............................. 2004-289652 |
| Mar. 14, 2005 | (JP) | ............................. 2005-072040 |

(51) Int. Cl.
C09D 11/02 (2006.01)

(52) U.S. Cl. ............... 106/31.27; 106/31.6; 106/31.58; 106/31.86

(58) Field of Classification Search ............ 106/31.27, 106/31.6, 31.58, 31.86
See application file for complete search history.

(56) References Cited

U.S. PATENT DOCUMENTS 4,804,411 A   2/1989 Eida et al. .................... 106/22
4,864,324 A   9/1989 Shirota et al. ............... 346/1.1
5,059,246 A  10/1991 Yamamoto et al. ........... 106/22
5,074,914 A  12/1991 Shirota et al. ................ 106/22

(Continued)

FOREIGN PATENT DOCUMENTS

JP         4-332775        11/1992

(Continued)

*Primary Examiner*—J A Lorengo
*Assistant Examiner*—Veronica Faison-Gee
(74) *Attorney, Agent, or Firm*—Fitzpatrick, Cella, Harper & Scinto

(57) ABSTRACT

Ink jet ink which sufficiently suppresses curling phenomenon of printed matters and satisfies ejection stability, the ink comprising at least water, a colorant, a water-soluble organic compound 1 and a water-soluble organic compound 2, wherein the content $X(\%)$ of the water-soluble organic compound 1 is 10 mass % or more based on the total amount of the ink jet ink and the content $X(\%)$ of the water-soluble organic compound 1 and the content $Y(\%)$ of the water-soluble organic compound 2 based on the total amount of the ink jet ink satisfy the relation of the following formula (I) and formula (II):

$$0 < Y/X \leq 0.9, \tag{I}$$

$$X + Y \geq 15 \text{ mass \%}, \tag{II}$$

and wherein the water-soluble organic compound 1 is a water-retentive, water-soluble organic compound having a difference between the water retention ability in an environment of a temperature of 23° C. and a humidity of 45% and the water retention ability in an environment of a temperature of 30° C. and a humidity of 80% of 36% or less, and the water-soluble organic compound 2 is a water-soluble organic compound other than the colorant and the water-soluble organic compound 1.

28 Claims, 5 Drawing Sheets

U.S. PATENT DOCUMENTS

| | | |
|---|---|---|
| 5,081,470 A | 1/1992 | Kurabayashi et al. ......... 346/1.1 |
| 5,110,356 A | 5/1992 | Shirota et al. ................. 106/22 |
| 5,118,351 A | 6/1992 | Shirota et al. ................. 106/22 |
| 5,123,960 A | 6/1992 | Shirota et al. ................. 106/22 |
| 5,124,201 A | 6/1992 | Kurabayashi et al. ......... 428/323 |
| 5,135,570 A | 8/1992 | Eida et al. ..................... 106/22 |
| 5,135,571 A | 8/1992 | Shirota et al. ................. 106/22 |
| 5,137,778 A | 8/1992 | Nakatsugawa et al. ..... 428/330 |
| 5,139,573 A | 8/1992 | Yamamoto et al. ........... 106/22 |
| 5,141,558 A | 8/1992 | Shirota et al. ................. 106/22 |
| 5,151,128 A | 9/1992 | Fukushima et al. ........... 106/20 |
| 5,171,626 A | 12/1992 | Nagamine et al. ........... 428/212 |
| 5,190,581 A | 3/1993 | Fukushima et al. ......... 106/20 D |
| 5,216,437 A | 6/1993 | Yamamoto et al. ........... 346/1.1 |
| 5,220,347 A | 6/1993 | Fukushima et al. ........... 346/1.1 |
| 5,221,333 A | 6/1993 | Shirota et al. ............. 106/20 D |
| 5,231,417 A | 7/1993 | Shirota et al. ................. 346/1.1 |
| 5,246,774 A | 9/1993 | Sakaki et al. ................. 428/323 |
| 5,248,991 A | 9/1993 | Shirota et al. ................. 346/1.1 |
| 5,250,121 A | 10/1993 | Yamamoto et al. ........ 106/20 R |
| 5,254,157 A | 10/1993 | Koike et al. ............... 106/20 D |
| 5,258,066 A | 11/1993 | Kobayashi et al. ........ 106/22 R |
| 5,277,962 A | 1/1994 | Nakatsugawa et al. ..... 428/206 |
| 5,296,022 A | 3/1994 | Kobayashi et al. ........ 106/20 D |
| 5,329,305 A | 7/1994 | Fukushima et al. ........... 347/95 |
| 5,356,464 A | 10/1994 | Hickman et al. ........... 106/20 R |
| 5,358,558 A | 10/1994 | Yamamoto et al. ......... 106/22 R |
| 5,362,558 A | 11/1994 | Sakaki et al. ................. 428/323 |
| 5,415,686 A | 5/1995 | Kurabayashi et al. ..... 106/26 R |
| 5,427,611 A | 6/1995 | Shirota et al. ............. 106/22 A |
| 5,439,515 A | 8/1995 | Kurabayashi et al. ..... 106/20 R |
| 5,500,023 A | 3/1996 | Koike et al. ..................... 8/499 |
| 5,515,093 A | 5/1996 | Haruta et al. ................. 347/101 |
| 5,526,031 A | 6/1996 | Kurabayashi ................. 347/105 |
| 5,540,764 A | 7/1996 | Haruta et al. ............... 106/20 R |
| 5,549,740 A | 8/1996 | Takahashi et al. .......... 106/20 R |
| 5,580,373 A | 12/1996 | Lane et al. ................ 106/20 R |
| 5,593,757 A | 1/1997 | Kashiwazaki et al. ...... 428/195 |
| 5,606,356 A | 2/1997 | Noguchi et al. ............. 347/100 |
| 5,614,007 A | 3/1997 | Kurabayashi et al. ..... 106/22 R |
| 5,618,338 A | 4/1997 | Kurabayashi et al. ..... 106/26 R |
| 5,621,447 A | 4/1997 | Takizawa et al. ............. 347/88 |
| 5,623,294 A | 4/1997 | Takizawa et al. ............. 347/98 |
| 5,624,484 A | 4/1997 | Takahashi et al. ......... 106/31.75 |
| 5,640,187 A | 6/1997 | Kashiwazaki et al. ...... 347/101 |
| 5,651,814 A | 7/1997 | Shimomura et al. ..... 106/31.36 |
| 5,656,071 A * | 8/1997 | Kappele et al. .......... 106/31.76 |
| 5,658,376 A | 8/1997 | Noguchi et al. ........... 106/31.43 |
| 5,680,165 A | 10/1997 | Takizawa et al. ............. 347/88 |
| 5,696,182 A | 12/1997 | Kashiwazaki et al. ...... 523/161 |
| 5,698,478 A | 12/1997 | Yamamoto et al. .......... 442/153 |
| 5,700,314 A | 12/1997 | Kurabayashi et al. .... 106/31.27 |
| 5,734,403 A | 3/1998 | Suga et al. ................... 347/101 |
| 5,764,261 A | 6/1998 | Koike et al. ................. 347/100 |
| 5,781,216 A | 7/1998 | Haruta et al. ................. 347/106 |
| 5,782,967 A | 7/1998 | Shirota et al. .............. 106/31.58 |
| 5,792,249 A | 8/1998 | Shirota et al. .............. 106/31.27 |
| 5,835,116 A | 11/1998 | Sato et al. ..................... 347/98 |
| 5,849,815 A | 12/1998 | Aoki et al. ................... 523/161 |
| 5,902,387 A | 5/1999 | Suzuki et al. .............. 106/22 R |
| 5,922,625 A | 7/1999 | Haruta et al. ................. 442/75 |
| 5,985,975 A | 11/1999 | Kurabayashi et al. ....... 524/462 |
| 6,027,210 A | 2/2000 | Kurabayashi et al. ....... 347/100 |
| 6,036,307 A | 3/2000 | Hakamada et al. .......... 347/106 |
| 6,084,006 A | 7/2000 | Kashiwazaki et al. ...... 523/160 |
| 6,114,020 A | 9/2000 | Misuda et al. ................. 428/212 |
| 6,139,939 A | 10/2000 | Haruta et al. ................. 428/195 |
| 6,162,510 A | 12/2000 | Kashiwazaki et al. ....... 427/511 |
| 6,203,604 B1 | 3/2001 | Kashiwazaki et al. ..... 106/31.5 |
| 6,214,963 B1 | 4/2001 | Noguchi et al. ................. 528/71 |
| 6,238,045 B1 | 5/2001 | Ono et al. ..................... 347/96 |
| 6,248,482 B1 | 6/2001 | Kashiwazaki et al. ......... 430/7 |
| 6,322,209 B1 | 11/2001 | Sato et al. ..................... 347/105 |
| 6,341,855 B1 | 1/2002 | Kurabayashi ................. 347/100 |
| 6,342,096 B1 | 1/2002 | Kurabayashi ............. 106/31.27 |
| 6,367,921 B1 | 4/2002 | Kurabayashi et al. ........ 347/101 |
| 6,391,440 B1 | 5/2002 | Yoshino et al. ............. 428/342 |
| 6,391,947 B1 | 5/2002 | Noguchi et al. ............... 524/84 |
| 6,394,597 B1 | 5/2002 | Koike et al. ................. 347/106 |
| 6,398,355 B1 | 6/2002 | Shirota et al. ................. 347/100 |
| 6,399,674 B1 | 6/2002 | Kashiwazaki et al. ...... 523/161 |
| 6,412,936 B1 | 7/2002 | Mafune et al. ............. 347/100 |
| 6,426,766 B1 | 7/2002 | Shirota et al. ................. 347/106 |
| 6,460,987 B1 | 10/2002 | Katsuragi et al. ............. 347/100 |
| 6,460,989 B1 | 10/2002 | Yano et al. ................... 347/101 |
| 6,471,757 B1 | 10/2002 | Koitabashi et al. ....... 106/31.28 |
| 6,474,803 B1 | 11/2002 | Shirota et al. ................. 347/100 |
| 6,517,199 B1 | 2/2003 | Tomioka et al. .............. 347/101 |
| 6,521,323 B1 | 2/2003 | Sakaki et al. ................. 428/195 |
| 6,536,890 B1 | 3/2003 | Kato et al. ................... 347/100 |
| 6,540,344 B2 | 4/2003 | Kashiwazaki et al. ...... 347/100 |
| 6,552,156 B2 | 4/2003 | Noguchi et al. ................. 528/71 |
| 6,619,791 B2 | 9/2003 | Tochihara et al. ............. 347/100 |
| 6,659,601 B2 | 12/2003 | Goto et al. ................... 347/100 |
| 6,670,000 B1 | 12/2003 | Misuda et al. ................. 428/32.1 |
| 6,695,443 B2 * | 2/2004 | Arita et al. ................... 347/100 |
| 6,719,420 B2 | 4/2004 | Tomioka et al. .............. 347/100 |
| 6,723,137 B1 | 4/2004 | Hakamada et al. ............... 8/549 |
| 6,729,718 B2 | 5/2004 | Goto et al. ................... 347/100 |
| 6,730,375 B2 | 5/2004 | Moriya et al. ............... 428/32.37 |
| 6,746,114 B2 | 6/2004 | Takahashi et al. ............ 347/100 |
| 6,780,901 B1 | 8/2004 | Endo et al. ................... 523/160 |
| 6,783,299 B2 | 8/2004 | Meron et al. ................. 403/325 |
| 6,790,878 B2 | 9/2004 | Kurabayashi ................. 523/160 |
| 6,794,427 B2 | 9/2004 | Kurabayashi et al. ........ 523/161 |
| 6,811,839 B2 | 11/2004 | Hiro et al. ................... 428/32.3 |
| 6,821,328 B2 | 11/2004 | Tomioka et al. ........... 106/31.33 |
| 6,860,593 B2 | 3/2005 | Kashiwazaki et al. ...... 347/100 |
| 6,874,881 B2 | 4/2005 | Suzuki et al. ................. 347/100 |
| 6,899,753 B2 * | 5/2005 | Leu et al. ................... 106/31.58 |
| 6,966,944 B2 | 11/2005 | Shimomura et al. ..... 106/31.43 |
| 7,029,109 B2 | 4/2006 | Shirota et al. ................. 347/100 |
| 7,055,943 B2 | 6/2006 | Suzuki et al. ................. 347/100 |
| 2003/0089272 A1 | 5/2003 | Taniguchi et al. .......... 106/31.13 |
| 2003/0109600 A1 | 6/2003 | Shirota et al. ................. 523/160 |
| 2003/0199611 A1 | 10/2003 | Chandrasekaran et al. .. 523/160 |
| 2005/0284332 A1 | 12/2005 | Shinjo et al. .............. 106/31.27 |
| 2005/0288384 A1 | 12/2005 | Kanke et al. ..................... 522/6 |
| 2006/0000386 A1 | 1/2006 | Hakamada et al. ........ 106/31.13 |
| 2006/0004116 A1 | 1/2006 | Kishi et al. ................... 522/146 |
| 2006/0007280 A1 | 1/2006 | Nito et al. .................... 347/100 |
| 2006/0011097 A1 | 1/2006 | Tsuji et al. ................ 106/31.48 |
| 2006/0065157 A1 | 3/2006 | Kawabe et al. ............ 106/31.48 |
| 2006/0137570 A1 | 6/2006 | Osumi et al. .............. 106/31.27 |
| 2006/0194056 A1 | 8/2006 | Nagashima et al. .......... 428/403 |
| 2006/0194897 A1 | 8/2006 | Kawabe et al. .............. 523/160 |

FOREIGN PATENT DOCUMENTS

| | | |
|---|---|---|
| JP | 6-157955 | 6/1994 |
| JP | 6-240189 | 8/1994 |
| JP | 9-165539 | 6/1997 |
| JP | 9-176538 | 7/1997 |
| JP | 10-130550 | 5/1998 |
| JP | 2000-198267 | 7/2000 |
| JP | 2003-96343 | 4/2003 |
| JP | 2003-160751 | 6/2003 |
| JP | 2004-209762 | 7/2004 |
| JP | 2004-210906 | 7/2004 |
| WO | WO 03/076532 | 9/2003 |

* cited by examiner

INK JET INK AND INK JET RECORDING METHOD

This application is a continuation of International Application No. PCT/JP2005/005309, filed Mar. 16, 2005, which claims the benefit of Japanese Patent Application Nos. 2004-075391 filed on Mar. 16, 2004, 2004-075392 filed on Mar. 16, 2004, 2004-289652 filed on Oct. 1, 2004 and 2005-072040 filed on Mar. 14, 2005.

BACKGROUND OF THE INVENTION

1. Field of the Invention

The present invention relates to ink jet ink, an ink jet recording method, an ink cartridge, and an ink jet recording apparatus.

2. Related Background Art

An ink jet recording method refers to a method which conducts recording of images and texts by allowing fine droplets of ink to fly according various operational principles to apply them on a recording medium (e.g. paper). The technique has features like high speed, low noise, ease in multicolor printing, high flexibility of recording patterns and no need for development and fixing, and is therefore rapidly spreading to a wide variety of applications. In addition, full color ink jet recording system has been recently developed and this enables formation of multi-color images comparable to those by polychromic printing according to a prepress method or printed images produced by color photography. For printing in small numbers, the technique can produce printed matters at lower costs than usual polychromic or photographic printing. Under such circumstances, in response to the demand for improved recording properties including high speed, high definition and full color of recording, improvement of ink jet recording apparatus and recording method has been attempted. Since image forming apparatuses such as printers to which the ink jet recording system is applied are used in various situations, recording stability is also important and in addition, improved durability of images is a property required for ink.

As recording media used in the ink jet recording method, various items such as plain paper, coated paper, glossy paper, OHP sheet and back print film are marketed, while for general use in offices, low price plain paper is mostly used. However, when plain paper is used as a recording medium, it becomes necessary to decrease or prevent curling phenomenon (warping or curl of paper) which occurs when a large amount of ink is applied on the recording medium, while satisfying the aforementioned properties. This curling phenomenon is mainly attributable to applied moisture. That is, it is known that considerable curling phenomenon occurs when moisture is applied to a large area, or in a greater amount. In the case of ink jet recording conducted on plain paper, reduction or suppression of not only curling phenomenon during printing but also curling phenomenon after printing caused by drying and evaporation of moisture (curling phenomenon after printing) have become important.

The printed matter (print) obtained according to the ink jet system are used for various purposes, but curled paper cannot be kept flat, causing a lot of troubles such as curling phenomenon when being piled or put in files. In addition, test printing of presentation documents such as slides and OHP sheet is often conducted on inexpensive plain paper and when figures, photographs or background are printed with the secondary color (blue, etc.), paper becomes warped, making it difficult to handle in many cases.

Some approaches to decrease or prevent curling phenomenon have been proposed so far. For example, ink jet ink containing a solid substance which is soluble in water or an aqueous organic solvent and has four or more hydroxyl groups in a molecular structure is proposed (e.g. see Japanese Patent Application Laid-Open No. H04-332775). In addition, ink containing a saccharide, a sugar alcohol and a specific amide compound as anti-curling agents is proposed (e.g. see Japanese Patent Application Laid-Open No. H06-157955, Japanese Patent Laid-Open No. H06-240189, Japanese Patent Application Laid-Open No. H09-165539 and Japanese Patent Application Laid-Open No. H09-176538). Further, ink containing a specific polyhydric alcohol and glycerol in combination is proposed (see e.g. Japanese Patent Application Laid-Open No. H10-130550). Moreover, ink containing a solvent, a polymer binder, a dye mordant, a water-soluble anti-curling compound, a water-soluble desizing compound, a light resistant compound and a defoaming agent is proposed (e.g. see Japanese Patent Application Laid-Open No. 2000-198267).

Curling phenomenon can be suppressed to some extent by incorporating conventional compounds for preventing curling phenomenon, but ink jet recording has been advanced and involves even higher speed, and ejection stability and reliability are important in the process of high speed printing. Accordingly, in addition to ensuring properties such as stability, permeability and viscosity of the ink itself, it is also important to maintain a high level of basic properties of ink for ink jet recording, in particular, ink jet ejection stability, which is more specifically an anti-clogging property at a ejection port (nozzle) of an ink jet recording head, and a start-up characteristic (re-eject ability of ink from a nozzle after temporal suspension (stopping or pausing) of ink ejection), and at the same time to decrease or prevent curling phenomenon.

Accordingly, an object of the present invention is to provide ink jet ink which can decrease or prevent curling phenomenon with ensuring, as required for conventional ink jet ink, a ejection stability after leaving a head and a ejection stability which can prevent initial portions of printing from being unstable or blurred at the beginning of printing (start-up characteristic), an ink jet recording method, an ink cartridge and an ink jet recording apparatus.

In addition, another object of the present invention is to sufficiently decrease or prevent curling phenomenon, thereby making it easier to handle printed matters prepared by using plain paper.

SUMMARY OF THE INVENTION

The above-mentioned objects are achieved by the present invention described below.

That is, the ink jet ink of the present invention comprises at least water, a colorant, a water-soluble organic compound 1 and a water-soluble organic compound 2, wherein the content X(%) of the water-soluble organic compound 1 is 10 mass % or more based on the total amount of the ink jet ink and the content X(%) of the water-soluble organic compound 1 and the content Y(%) of the water-soluble organic compound 2 based on the total amount of the ink jet ink satisfy the relation of the following formula (I) and formula (II):

$$0 < Y/X \leq 0.9, \tag{I}$$

$$X + Y \geq 15\% \text{ by mass}, \tag{II}$$

and wherein the water-soluble organic compound 1 is a water-retentive, water-soluble organic compound having a difference between the water retention ability in an environment of a temperature of 23° C. and a humidity of 45% and the water retention ability in an environment of a temperature of 30° C. and a humidity of 80% of 36% or less, and the water-soluble organic compound 2 is a water-soluble organic compound other than the colorant and the water-soluble organic compound 1.

In particular, it is preferable that the content Y(%) of the water-soluble organic compound 2 is Y<15% by mass and the difference between water retention abilities is 40% or more.

Further, another embodiment of the present invention is ink jet ink comprising at least water and a colorant, further comprising a water-soluble organic compound 1-1, a water-soluble organic compound 1-2, and a water-soluble organic compound 2-1, wherein the content $X_1$(%) of the water-soluble organic compound 1-1 based on the total amount of the ink jet ink, the content $X_2$(%) of the water-soluble organic compound 1-2 based on the total amount of the ink jet ink and the content $Y_1$(%) of the water-soluble organic compound 2-1 based on the total amount of the ink jet ink satisfy the relation of the following formulas (1) to (3):

$$0.1 \leq (X_2+Y_1)/X_1 \leq 2.5, \quad (1)$$

$$X_1+X_2 \geq 10\% \text{ by mass}, \quad (2)$$

$$X_2+Y_1 \geq 3\% \text{ by mass} \quad (3)$$

and wherein the water-soluble organic compound 1-1 is a water-soluble polyhydric alcohol or water-soluble amide compound having a difference between the water retention ability in an environment of a temperature of 23° C. and a humidity of 45% and the water retention ability in an environment of a temperature of 30° C. and a humidity of 80% of 36% or less, and a molecular weight Mw in the range of $100 \leq Mw \leq 1000$, the water-soluble organic compound 1-2 is a water-soluble alkanediol having a difference between the water retention ability in an environment of a temperature of 23° C. and a humidity of 45% and the water retention ability in an environment of a temperature of 30° C. and a humidity of 80% of 36% or less, and a molecular weight Mw in the range of $100 \leq Mw \leq 150$, the alkanediol further containing an —OH group at both terminals of a main chain, and the water-soluble organic compound 2-1 is a water-soluble organic compound other than the colorant, the water-soluble organic compound 1-1 and the water-soluble organic compound 1-2.

In particular, it is preferable that the content $Y_1$(%) of the water-soluble organic compound 2-1 is $Y_1$<15% by mass and the difference between water retention abilities is 40% or more.

The ink jet recording method of the present invention comprises applying the above-mentioned ink jet ink to a recording medium by an ink jet head to form an image.

The ink cartridge of the present invention contains the above-mentioned ink jet ink.

The ink jet recording apparatus of the present invention is equipped with the above-mentioned ink jet ink.

According to the present invention, curling phenomenon can be sufficiently prevented and handling of printed matters of plain paper, in particular, is thus made easier in an ink jet recording method using plain paper. In addition, ink and a recording method using the same which can achieve ejection stability of ink in ink jet recording are provided. Further-more, ink and a recording method using the same which can achieve excellent image characteristics are provided.

DESCRIPTION OF THE PREFERRED EMBODIMENTS

Figure 1:
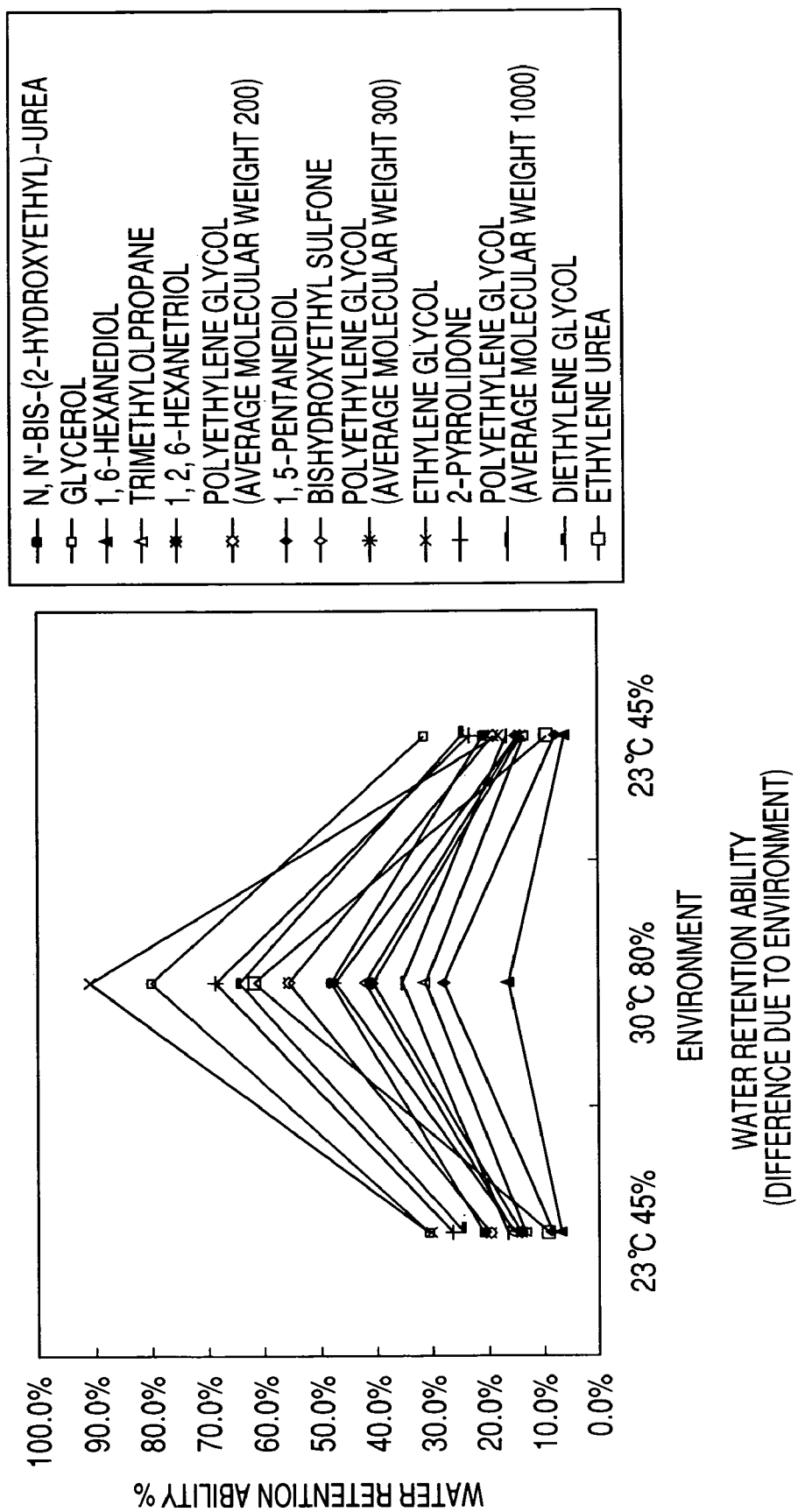
FIG. 1 illustrates the results of measurement of water retention ability of water-soluble organic compounds.

Hereinafter, the present invention is described in more detail referring to preferred embodiments.

[Mechanism of Occurrence of Curling Phenomenon]

The present invention has been made with the aim of preventing curling phenomenon of recording media after applying ink jet ink (hereinafter referred to as "ink") on recording media by an ink jet recording method.

The mechanism of occurrence of curling phenomenon after printing on a recording medium is as follows. Cellulose fiber is formed into paper by a papermaking machine so as to be aligned (substantially forcibly oriented) along the direction of flow of paper. Since cellulose fiber has greatly different degrees of expansion due to moisture in the machine direction and the cross direction, dimensional change which occurs upon application of moisture varies in the short grain and in the long grain. Therefore, when moisture is applied on paper, cellulose fiber in the cross direction of paper is swelled and the length of paper is increased in the direction (mostly the long grain of paper) perpendicular to the flow direction (mostly the short grain of paper) of the papermaking machine when paper is formed. For this reason, when the amount of ink applied, i.e., the amount of moisture applied, is large upon printing, curling phenomenon occurs toward the direction opposite to the plane on which moisture is applied, namely, negative curling phenomenon occurs. However, due to gradual vaporization of moisture which was once absorbed into cellulose fiber, cellulose fiber starts to shrink to allow paper to shrink. According to this, the length of paper becomes shorter than that before moisture is applied. Thus, the paper gradually curls toward the direction of the plane on which moisture is applied, namely, positive curling phenomenon occurs. This seems to occur because moisture applied by printing first enters into hydrogen bond between fibers and as the moisture is transferred due to evaporation or the like, the tension applied at an initial stage is released and printed portions are shrunk. This positive curling phenomenon poses problems when ink jet recording is conducted on recording media such as plain paper.

The inventors of the present invention carried out detail observation of positive curling phenomenon which occurs when printing is conducted by an ink jet recording method. As a result, they have found that the positive curling phenomenon continuously progresses for a long period when ink jet ink is applied on paper unlike the case where moisture is simply applied to paper.

At present, organic compounds such as glycerol and urea which are contained in most kinds of ink jet ink greatly contribute to reliability, in particular, ejection stability of ink jet ink. On the contrary, it is considered that these organic compounds may be a cause of continuous progress of positive curling phenomenon.

[Water-Retentive, Water-Soluble Organic Compound]

Since curling phenomenon after applying a liquid medium containing water on paper seems to have a correlation with vaporization of moisture applied on the paper, inventors of the present invention conducted the following detailed studies on the water retention ability of water-soluble organic compounds which are commonly used for ink jet ink.

First, 20 mass % aqueous solutions of various water-soluble organic compounds were prepared and 10 g of each solution was precisely weighed and put in a glass petri dish, and left to stand in an environment of a temperature of 23° C. and a humidity of 45%. Pure water containing no water-soluble organic compound was also left to stand. Due to vaporization of water, the solution in the petri dish decreased and consequently the weight becomes constant. In glass petri dish also left, which contained only pure water, all pure water was vaporized at this point, and it is thus considered that those remained in the petri dish containing a water-soluble organic compound is the water-soluble organic compound and the moisture retained in the substance. Based on this, the water retention ability of each water-soluble organic compound was calculated according to the following formula.

$$\text{Water retention ability \%} = \frac{(\text{Mass of remaining substance (g)}) - (\text{Mass of water} - \text{soluble compound(g)})}{(\text{Mass of water} - \text{soluble compound (g)})}$$

Figure 2:
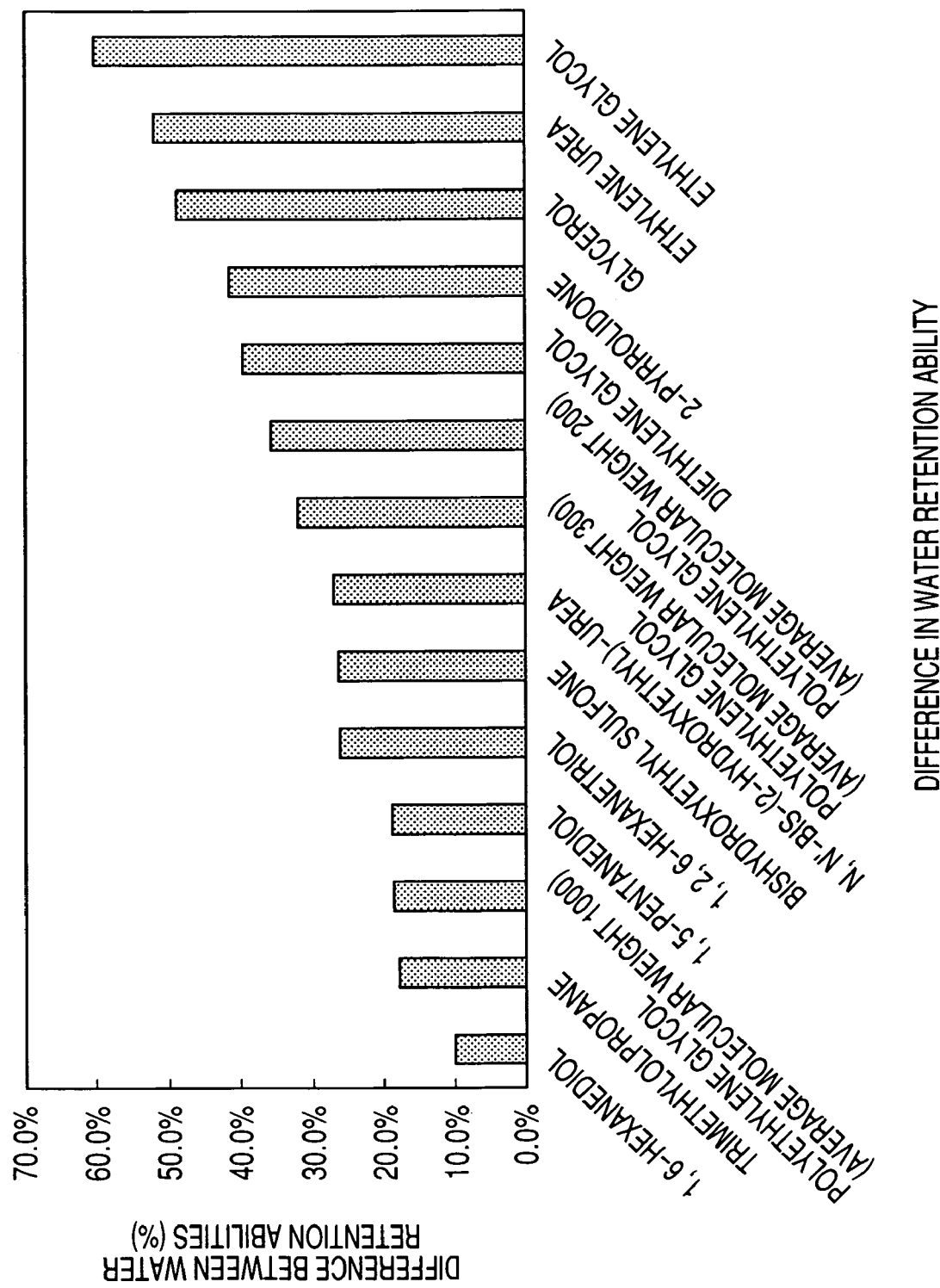
FIG. 2 illustrates the difference between water retention abilities in two specific environments.

Next, the above petri dish was moved to an environment of a temperature of 30° C. and humidity of 80% and after waiting until equilibrium is reached as in the above, then the water retention ability was measured under this condition. Further, the same petri dish was moved to an environment of a temperature of 23° C. and a humidity of 45% again and the water retention ability was measured. The obtained results are shown in FIG. 1. In addition, differences of water retention abilities in both environments are shown in FIG. 2.

The inventors of the present invention have considered some correlation between the difference between water retention abilities under the aforementioned environments and the occurrence of curling phenomenon of plain paper. Based on this, occurrence of curling phenomenon was studied by applying, on plain paper, aqueous solutions containing a water-soluble organic compound examined above. As a result, it has been found that the water-soluble organic compound 1 which has a difference between the water retention ability in an environment of a temperature of 23° C. and a humidity of 45% and the water retention ability in an environment of a temperature of 30° C. and a humidity of 80% of 36% or less can significantly prevent curling phenomenon. Then, ink containing a coloring material, additives and these water-soluble organic compounds was prepared and ink jet recording was conducted to observe occurrence of curling phenomenon. As a result, it was confirmed that no curling phenomenon occurred even after lapse of a few days at room temperature after printing.

The water-retentive water-soluble organic compound in the present invention refers to a water-soluble organic compound having a water retention ability of 5% or more in an environment of a temperature of 23° C. and a humidity of 45%.

However, when ink composed of a water-soluble organic compound 1 as only water-soluble organic compound is put in an ink jet recording head which ejects droplets from nozzles and the head is attached to an ink jet recording apparatus and left for a long time, there arose other problems that the ejection stability is deteriorated due to clogging of the nozzles and that printing of initial portions is unstable at the beginning of printing in a low temperature, low humidity environment.

In such circumstances, the inventors of the present invention have continued further studies with the aim of ensuring ejection stability equal to that of conventional ink jet ink with preventing curling phenomenon to a certain degree or more. As a result, it has been finally found that the above-mentioned problems can be solved by adding, to ink jet ink, in addition to the a water-soluble organic compound 1, a water-soluble organic compound other than the water-soluble organic compound 1, which is more specifically a water-soluble organic compound 2 having a difference between the water retention ability in an environment of a temperature of 23° C. and a humidity of 45% and the water retention ability in an environment of a temperature of 30° C. and a humidity of 80% of more than 36%, in a proportion satisfying the conditions of the following formula (I) and formula (II)

$$0 < Y/X \leq 0.9 \tag{I}$$

$$X + Y \geq 15 \text{ mass \%} \tag{II}$$

(X: content (%) of water-soluble organic compound 1 based on the total amount of the ink jet ink, Y: content (%) of water-soluble organic compound based on the total amount of the ink jet ink).

Furthermore, the studies by the inventors of the present invention has revealed that when a large amount, specifically more than 3.0 g/m², of ink is applied, the content X(%) of the water-soluble organic compound 1 needs to be 10 mass % or more based on the total amount of the ink jet ink, in addition to the above-mentioned conditions.

The water-soluble organic compound 1 is preferably a polyhydric alcohol having an amide bond or polyhydric alcohol having a sulfone group.

The water-soluble organic compound 2 in the present invention corresponds to water-soluble organic compounds generally used for ink jet ink. The water-soluble organic compound 2 has a great difference between water retention abilities, easily releases moisture in the process of drying of recording media to which moisture is applied, and accelerates shrinkage of cellulose fiber. Most of the water-soluble organic compounds 2 have small molecular weight of about 100 or less, and easily migrate within a recording medium as moistures do, and are difficult to be fixed on cellulose fiber. Accordingly, the water-soluble organic compound 2 gradually migrates within the recording medium to accelerate curling phenomenon. Therefore, curling phenomenon is rather great when a large amount of ink containing a water-soluble organic compound 2 which is usually used for ink jet ink is applied on plain paper.

The studies by the inventors of the present invention have revealed that even if ink jet ink contains a water-soluble organic compound 2 which has a property of accelerating curling phenomenon, curling phenomenon can be effectively prevented and ejection stability is improved when the above-mentioned water-soluble organic compound is contained and the content ratio Y/X of the water-soluble organic compound and the water-soluble organic compound is adjusted to 0<Y/X≦0.9 as shown in the formula (1).

In addition, the inventors of the present invention have also found that the total content X+Y(%) of the water-soluble organic compound 1 and the water-soluble organic compound 2 must be X+Y≧15 mass %. This is because when ink is applied on paper, it is necessary to relatively reduce the moisture content by increasing the total content of the water-soluble organic compounds in the ink jet ink in order to prevent vaporization of water in a short term and paper shrinkage due to migration in particular. In addition to this, it is speculated that, in order to prevent vaporization of ink applied on paper, the total amount of water-retentive water-soluble organic compounds, i.e., the water-soluble organic compound 1 and the water-soluble organic compound 2, needs to be 15 mass % or more.

The above-mentioned X+Y satisfies the relation of more preferably X+Y≧20 mass %, further preferably X+Y≧25 mass %. The inventors of the present invention prepared ink having a greater total content X+Y (%) of the water-soluble organic compound 1 and the water-soluble organic compound 2 and observed curling phenomenon. As a result, when the above-mentioned X+Y is great, curling phenomenon which occurs within a short time after printing can be effectively prevented. In particular, when the X+Y is X+Y≧25 mass %, curling phenomenon which occurs within a short time after printing has improved quite effectively.

In addition, the water content is preferably 77 mass % or less, more preferably 71 mass % or less based on the total amount of the ink jet ink.

In addition, the content Y(%) of the water-soluble organic compound 2 is preferably Y<15 mass % based on the total amount of the ink jet ink. The reason for this can be presumed as follows. As described above, since the water-soluble organic compound has a property of accelerating curling phenomenon, the higher the content thereof in the ink, the higher the occurrence of curling phenomenon. For this reason, even if ink jet ink contains a large amount of water-soluble organic compound 1, the water-soluble organic compound causes migration of the water-soluble organic compound 1, reducing the effect of preventing curling phenomenon of the water-soluble organic compound 1. The difference between water retention abilities of the water-soluble organic compound is preferably 40% or more.

Another embodiment of the present invention described below can also effectively prevent curling phenomenon after printing on a recording medium, in particular, plain paper, and can achieve excellent ejection stability.

The inventors of the present invention continued further studies using the water-soluble organic compound and the water-soluble organic compound 2. As a result, it has been found that the above-mentioned problems can be effectively solved by incorporating, in ink jet ink, one or more of each of specific water-soluble organic compound 1-1 and water-soluble organic compound 1-2 among the water-soluble organic compounds 1. That is, it has been found that the above-mentioned problems can be solved by incorporating a water-soluble organic compound 1-1, a water-soluble organic compound 1-2, and a water-soluble organic compound 2-1 in a proportion that the contents $X_1$(%), $X_2$(%) and $Y_1$(%) of the aforementioned water-soluble organic compounds based on the total amount of the ink jet ink satisfy the following conditions.

$$0.1 \leq (X_2+Y_1)/X_1 \leq 2.5 \quad (1)$$

$$10 \text{ mass }\% \leq X_1+X_2 \quad (2)$$

$$3 \text{ mass }\% \leq X_2+Y_1 \quad (3)$$

($X_1$: content (%) of water-soluble organic compound 1-1 based on the total amount of the ink jet ink, $X_2$: content (%) of the water-soluble organic compound 1-2 based on the total amount of the ink jet ink, $Y_1$: content (%) of water-soluble organic compound 2-1 based on the total amount of the ink jet ink)

The action of the water-soluble organic compound 1-1 and the water-soluble organic compound 1-2 in this embodiment is described below.

The water-soluble organic compound 1-1 is a water-soluble polyhydric alcohol or water-soluble amide compound having a difference between the water retention ability in an environment of a temperature of 23° C. and a humidity of 45% and the water retention ability in an environment of a temperature of 30° C. and a humidity of 80% of 36% or less, and a molecular weight Mw in the range of 100≦Mw≦1000.

Because the water-soluble organic compound 1-1 has large molecules, it is difficult to penetrate into cellulose fiber and thus has little effect on curling phenomenon occurring within a relatively short time after printing. However, once the compound enters into cellulose fiber, it hardly causes migration. This seems to be because the compound has moderate water retention ability and is less likely to accumulate water more than needed, and has high affinity with cellulose fiber because the compound has, in the molecule, a plurality of, specifically, at least three portions which easily form a hydrogen bond.

For example, triols have 3 or more —OH groups, saccharides have 2 or more —OH groups and a carbonyl group, N,N'-bis-(2-hydroxyethyl)-urea has 2 or more —OH groups and an amide bond, bishydroxyethyl sulfone has 2 or more —OH groups and a sulfone group, and tetraethylene glycol has 2 or more —OH groups and 3 or more ether bonds. It is also considered that a plurality of factors such as large molecular size and low possibility of migration with water are playing some part effectively.

On the other hand, although diethylene glycol, for example, has a molecular weight of 100 or more and 2—OH groups at both terminals of the molecule and an ether bond in the molecule, the effect of preventing curling phenomenon is low. This seems to be because the hydrophilicity (property of bonding to hydrogen) is smaller with only one ether bond compared to one —OH group, and in an aqueous solution containing the same, molecules are bent due to interaction between the ether bond and water molecules and the molecular size becomes smaller. It is thus considered that diols having an ether bond in the molecule needs to have at least three ether bonds so as to exhibit the effect of preventing curling phenomenon.

The water-soluble organic compound 1-2 is water-soluble alkane diol having a difference between the water retention ability in an environment of a temperature of 23° C. and a humidity of 45% and the water retention ability in an environment of a temperature of 30° C. and a humidity of 80% of 36% or less, and a molecular weight Mw in the range of 100≦ Mw≦150 and an —OH group at both terminals of the main chain.

The action of the water-soluble organic compound 1-2 is to prevent curling phenomenon which occurs within a relatively short time after printing (a few hours after printing). Although the water-soluble organic compound 1-2 effectively prevents curling phenomenon which occurs within a relatively short time after printing, it has a smaller effect on curling phenomenon which occurs within a time frame longer than that (5, 6 hours to several weeks). This seems to be because the water-soluble organic compound 1-2 is alkane diol which has a molecular weight of 100 to 150 or lower and contains a —OH group at both terminals of the main chain, and as it contains no hydrophilic bond such as an ether bond in the molecule, the molecules are not bent, making the molecular size relatively large. In addition, it is considered that due to its lipophilic intermolecular structure and hydrophilic molecular terminals, the compound has a characteristic similar to that of a surfactant and thus tends to moisten the cellulose fiber quickly. Further, the moderate molecular size may make it easier to penetrate into the cellulose fiber, enabling the prevention of curling phenomenon which occurs within a short time. However, it is considered that because the number of —OH groups which have an affinity to cellulose fiber is small, migration may occur in a long time.

The inventors of the present invention have found that combination use of the water-soluble organic compound 1-1 and the water-soluble organic compound 1-2 has an effect of preventing curling phenomenon for a short time to a long time after printing compared to the case in which only one kind of the water-soluble organic compounds is contained. This seems to be because the water-soluble organic compound 1-1 and the water-soluble organic compound 1-2 have a similar structure and therefore have a high compatibility, and thus the water-soluble organic compound 1-1 can be effectively introduced to cellulose fiber together with the water-soluble organic compound 1-2, thereby achieving prevention of curling phenomenon for a short time to a long time after printing.

The inventors of the present invention have found that prevention of short-time curling phenomenon can be effectively improved particularly when the total content of the water-soluble organic compound 1-1 and the water-soluble organic compound 1-2 in the case of combination use is less than 25 mass % based on the total amount of the ink jet ink, or when the water content is more than 71 mass % based on the total amount of the ink jet ink. In particular, in the aforementioned conditions, ink containing a water-soluble organic compound 1-2 and ink which does not contain the same present a remarkable contrast in curling phenomenon which occurs within a relatively short time after printing.

As described above, ink jet ink containing the water-soluble organic compound 1-1 and the water-soluble organic compound 1-2 can prevent curling phenomenon effectively. However, to satisfy the ejection stability of ink jet ink, it is necessary to use a water-soluble organic compound 2-1 in combination.

Herein, the water-soluble organic compound 2-1 is other than a colorant, a water-soluble organic solvent 1-1 and a water-soluble organic solvent 1-2. More specifically, it is a water-soluble organic compound having a difference between the water retention ability in an environment of a temperature of 23° C. and a humidity of 45% and the water retention ability in an environment of a temperature of 30° C. and a humidity of 80% of more than 36%.

The reason can be assumed as follows. As described above, the water-soluble organic compound 1-2 has a surfactant-like characteristic, and has low compatibility with a colorant. Therefore, the water-soluble organic compound 1-2 exists near the ink jet nozzle at a concentration higher than those of other components, and this prevents vaporization of moisture near the nozzle. By using a water-soluble organic compound 2-1 which has high compatibility with colorant and high water retention ability, increase in viscosity inside the nozzle can be prevented and the ejection stability is improved.

The studies by the inventors of the present invention have revealed that even if ink jet ink contains water-soluble organic compound 2-1 which has a property of accelerating curling phenomenon, curling phenomenon can be continuously prevented for a short time to a long time after printing and ejection stability can be improved when the above-mentioned water-soluble organic compound 1-1 and water-soluble organic compound 1-2 are contained and the proportion $(X_2+Y_1)/X_1$ of the water-soluble organic compound 1-1, the water-soluble organic compound 1-2 and the water-soluble organic compound 2-1 is set to $0.1 \leq (X_2+Y_1)/X_1 \leq 2.5$ as shown in the formula (1).

The studies by the inventors of the present invention have also revealed that in order to prevent curling phenomenon when a large amount, specifically more than 3.0 g/m², of ink is applied, the sum $X_1+X_2$(%) of the contents of the water-soluble organic compound 1-1 and the water-soluble organic compound 1-2 must be $X_1+X_2 \geq 10$ mass %.

The studies by the inventors of the present invention have also revealed that to improve the ejection stability, the sum $X_2+Y_1$ of the contents of the water-soluble organic compound 1-2 and the water-soluble organic compound 2-1 must be $X_2+Y_1 \geq 3$ mass %, in addition to the above-mentioned conditions.

In addition, the water content is preferably 77 mass % or less, more preferably 71 mass % or less based on the total amount of the ink jet ink.

Further, the content $Y_1$ (%) of the water-soluble organic compound 2-1 is preferably $Y_1 < 15$ mass % based on the total amount of the ink jet ink. The reason can be assumed as follows. As described above, the water-soluble organic compound 2-1 has a property of accelerating curling phenomenon, and the higher the content thereof in the ink, the higher the occurrence of curling phenomenon. For this reason, even if ink jet ink contains large amounts of the water-soluble organic compound 1-1 and the water-soluble organic compound 1-2, the water-soluble organic compound 2-1 causes migration of the water-soluble organic compound 1-1 and the water-soluble organic compound 1-2, and reduces the effect of preventing curling phenomenon of the water-soluble organic compound 1-1 and the water-soluble organic compound 1-2. Further, the difference between water retention abilities of the water-soluble organic compound 2-1 is preferably 40% or more.

In addition to the formulae (1) to (3), at least one condition selected from the following (A) to (F) is preferably satisfied.

(A) $X_1$, $X_2$ and $Y_1$ further satisfy the following formulae $$0.2 \leq (X_2+Y_1)/X_1 \leq 2.0, X_1+X_2 \geq 13 \text{ mass \% and} \\ X_1+X_2+Y_1 \geq 15 \text{ mass \%}$$

(B) $X_1$, $X_2$ and $Y_1$ further satisfy the following formula $$0.2 \leq (X_2+Y_1)/X_1 \leq 1.5$$

(C) $X_1$, $X_2$ and $Y_1$ further satisfy the following formulae $$0.2 \leq (X_2+Y_1)/X_1 < 1.5, 0 \text{ mass \%} < Y_1 < 11 \text{ mass \% and} \\ X_1+X_2+Y_1 \geq 20 \text{ mass \%}$$

(D) $X_1$, $X_2$ and $Y_1$ further satisfy the following formulae $$0.2 \leq (X_2+Y_1)/X_1 \leq 1.5 \text{ and } X_1+X_2+Y_1 \geq 25 \text{ mass \%}$$

(E) $X_1$, $X_2$ and $Y_1$ further satisfy the following formulae $$0.2 \leq (X_2+Y_1)/X_1 \leq 1.0,\ X_1+X_2 \geq 13 \text{ mass \% and}$$
$$X_1+X_2Y_1 \geq 20 \text{ mass \%}$$

(F) $X_1$, $X_2$ and $Y_1$ further satisfy the following formula $$0 < Y_1/(X_1+X_2) \leq 0.9$$

[Ink Jet Ink]

Components constituting the ink jet ink of the present invention are described in detail.

(Water-Retentive, Water-Soluble Organic Compound)

In the following, specific examples of the water-soluble organic compound or the water-soluble organic compound 1-1, the water-soluble organic compound 1-2, and the water-soluble organic compound 2 or the water-soluble organic compound 2-1 are shown.

Specific examples of water-soluble organic compound 1

Water-soluble organic compounds having a polyethylene structure and containing a hydrophilic bonding group other than an —OH group, such as ethylene oxide modified glycerol triacrylate (the number of ethylene oxide added: 6 to 30), dipentaerythritol and ethylene oxide modified acrylate ester (the number of ethylene oxide added: 8 to 40).

Specific Examples of Water-Soluble Organic Compound 1 or Water-Soluble Organic Compound 1-1

Polyethylene glycols having an average molecular weight of 200 (main component: tetraethylene glycol), 300 (main component: hexaethylene glycol), 400 (main component: nonaethylene glycol), 600 (main component: tridecaethylene glycol) and 1000 (main component: docosaethylene glycol), tri- or higher valent alcohol compounds such as 1,2,6-hexanetriol, trimethylolpropane, trimethylolethane, pentaerythritol and diglycerol, and polyhydric alcohol compounds containing a group having a property of bonding to hydrogen, such as a carbonyl group, a sulfone group and an amide group, such as glucose, sorbitol, bishydroxyethyl sulfone, N,N'-bis-(2-hydroxyethyl)-urea and tetra-(2-hydroxyethyl)-phenyldiamide. Of these, in particular, polyethylene glycol having an average molecular weight of 200, 1,2,6-hexanetriol, trimethylolpropane, bishydroxyethyl sulfone and N,N'-bis-(2-hydroxyethyl)-urea are preferable.

Specific Examples of Water-Soluble Organic Compound 1 or Water-Soluble Organic Compound 1-2

Alkane diols having an —OH group at both terminals of the carbon main chain which may have a substituent, such as 1,5-pentanediol, 1,6-hexanediol, 1,7-heptanediol, 3-methyl-1,5-pentanediol, 2-amino-2-methyl-1,3-propanediol and 2-amino-2-ethyl-1,3-propanediol. Of these, in particular, 1,6-hexanediol is preferable.

Specific Examples of Water-Soluble Organic Compound 2 or Water-Soluble Organic Compound 2-1

Water-soluble organic compounds which contain a hydrophilic group and have a small number of carbon atoms, such as urea, ethylene glycol, 2-pyrrolidone, ethylene urea, glycerol and diethylene glycol. Of these, in particular, urea, 2-pyrrolidone, ethylene urea and glycerol are preferable.

In the present invention, at least one of the above-mentioned water-soluble organic compounds 1 or the water-soluble organic compounds 1-1 preferably has an amide bond in the molecule. In particular, N,N'-bis-(2-hydroxyethyl)-urea is preferable. The reason is because N,N'-bis-(2-hydroxyethyl)-urea has an ability to prevent association of molecules, and in the present invention where it is essential to use other water-soluble organic compounds together, it would prevent the association of the water-soluble organic compounds. Particularly, in the case of ink used for an ink jet recording method, abilities such as prevention of clogging and solubility of dye can be exhibited more easily, whereby curling phenomenon can be effectively prevented and ejection stability and reliability can be greatly improved.

In particular, when N,N'-bis-(2-hydroxyethyl)-urea or bishydroxyethyl sulfone is used as a water-soluble organic compound or a water-soluble organic compound 1-1, diol or triol having 5 or more carbon atoms is preferably used in combination. Of the diols or triols having 5 or more carbon atoms, in particular, 1,6-hexanediol and 1,2,6-hexanetriol are preferable. When they are used in combination, the above-mentioned ability to prevent association of molecules can be more effectively exerted, and a particularly excellent curling phenomenon prevention effect and ejection stability can be obtained.

Generally, those classified into water-soluble organic compound often increase viscosity when added to ink, and curling phenomenon can be improved when the amount to be added is increased, but in some cases, there was a problem of, in particular, start-up characteristic of the ejection stabilities. To solve this problem, at least one of the above-mentioned water-soluble organic compounds 1 or the water-soluble organic compounds 1-1 is preferably a water-soluble organic compound containing a sulfone bond in the molecule. Of such compounds, bishydroxyethyl sulfone is most preferable. This is because, when used in combination with other components, bishydroxyethyl sulfone makes solvation between the other components and water difficult, and reduces viscosity. Thus, in the case of ink jet ink recording method in particular, bishydroxyethyl sulfone is effective for improving start-up characteristic of the ejection stabilities.

In addition, water-soluble organic compounds such as urea and ethylene urea are preferable because they have a small molecular weight and do not easily increase the viscosity even if added in greater amounts. Water-soluble organic compounds such as urea and ethylene urea can be used as a water-retentive water-soluble organic compound in the present invention, by combining with a water-soluble organic solvent or a water-soluble compound such as dye. The result of measuring the water retention ability of ethylene urea (difference due to environment) shown in FIG. 1 indicates the data measured using a dye together.

For the molecular weight of the water-soluble organic compounds which have a molecular weight distribution, such as a polyhydric alcohol having an amide bond and polyethylene glycol mentioned above, an average molecular weight was determined by any of the followings.

(1) In accordance with JIS Handbook, Chemical Analysis, K0118 and K0123, mass spectrum measurement, gas chromatography-mass spectrometry (GC-MS) and liquid chromatography-mass spectrometry (LC-MS) were conducted to measure molecular weights.

(2) For polyethylene glycol having a molecular weight distribution, an average molecular weight thereof was measured by size exclusion chromatography (GPC) in accordance with JIS Handbook, Chemical Analysis, K0124 and determined to be the molecular weight. Further, for water-soluble organic compounds having a molecular weight distribution other than polyethylene glycol, weight average molecular weights converted to polyethylene glycol were calculated and determined to be the molecular weight.

(3) According to NMR, infrared spectroscopy or elemental analysis, structures of water-soluble organic compounds were identified to determine the molecular weight.

(Colorant)

Examples of the colorant used for the ink jet ink of the present invention include water-soluble dyes and pigments. The colorant may be used alone or in a combination of two or more.

(Dye)

Examples of the dye to be used in the present invention include anionic water-soluble dyes having a hue of black, cyan, magenta and yellow. The anionic water-soluble dye is not particularly limited as long as it is an acid dye, a direct dye or a reactive dye listed in COLOUR INDEX. In addition, even if not listed in COLOUR INDEX, the dye is not particularly limited as long as it contains an anionic group such as a sulfone group. These dyes are used in the range of from 1 to 10 mass %, preferably from 1 to 5 mass % based on the total amount of the ink jet ink. A dye other than the above-mentioned dyes can be also used. One specific example is a dye containing a carboxyl group as a solubilizing group. Of these dyes, a dye having a pH-dependent solubility is preferable. These dyes can be used in the range of 1 to 10 mass %, preferably 1 to 7 mass % in the ink.

In terms of the color index (C.I.) number, the following dyes can be listed. Obviously, dyes are not limited to the followings.

C.I. direct yellow: 8, 11, 12, 27, 28, 33, 39, 44, 50, 58, 85, 86, 87, 88, 98, 100, 110

C.I. direct red: 2, 4, 9, 11, 20, 23, 24, 31, 39, 46, 62, 75, 79, 80, 83, 89, 95, 197, 201, 218, 220, 224, 225, 226, 227, 228, 230

C.I. direct blue: 1, 15, 22, 25, 41, 76, 77, 80, 86, 90, 98, 106, 108, 120, 158, 163, 168, 199, 226

C.I. acid yellow: 1, 3, 7, 11, 17, 23, 25, 29, 36, 38, 40, 42, 44, 76, 98, 99

C.I. acid red: 6, 8, 9, 13, 14, 18, 26, 27, 32, 35, 42, 51, 52, 80, 83, 87, 89, 92, 94, 106, 114, 115, 133, 134, 145, 158, 198, 249, 265, 289

C.I. acid blue: 1, 7, 9, 15, 22, 23, 25, 29, 40, 43, 59, 62, 74, 78, 80, 90, 100, 102, 104, 117, 127, 138, 158, 161

C.I. direct black: 17, 19, 22, 31, 32, 51, 62, 71, 74, 112, 113, 154, 168

C.I. acid black: 2, 48, 51, 52, 110, 115, 156

C.I. reactive black: 1, 8, 12, 13

C.I. food black: 1, 2

(Pigment)

Examples of the pigment used in the present invention include carbon black and organic pigments. These pigments are used in the range of 1 to 20 mass %, preferably 2 to 12 mass % based on the total amount of the ink jet ink.

Carbon Black

Specific examples of carbon black include carbon black pigments including furnace black, lamp black, acetylene black and channel black, and usable are, for example, Raven 7000, Raven 5750, Raven 5250, Raven 5000, Raven 3500, Raven 2000, Raven 1500, Raven 1250, Raven 1200, Raven 1190 ULTRA-II, Raven 1170, Raven 1255 (available from Colombian Carbon), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (available from Cabot), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (available from Degussa), No. 25, No. 33, No. 40, No. 47, No. 52, No. 900, No. 2300, MCF-88, MA600, MA7, MA8, MA100 (available from Mitsubishi Chemical). Obviously, carbon black is not limited to these and conventionally known carbon black may also be used. In addition, fine particles of magnetic materials such as magnetite and ferrite or titanium black may be used as black pigment.

Organic Pigment

Specific examples of organic pigment include insoluble azo pigments such as Toluidine Red, Toluidine Maroon, Hansa Yellow, Benzidine Yellow and Pyrazolone Red, soluble azo pigments such as Lithol Red, Helio Bordeaux, Pigment Scarlet and Permanent Red 2B, derivatives from vat dyes such as Alizarin, Indanthrone and Thioindigo Maroon, phthalocyanine pigments such as Phthalocyanine Blue and Phthalocyanine Green, quinacridone pigments such as Quinacridone Red and Quinacridone Magenta, perylene pigments such as Perylene Red and Perylene Scarlet, isoindorinone pigments such as Isoindorinone Yellow and Isoindorinone Orange, imidazolone pigments such as Benzoimidazolone Yellow, Benzoimidazolone Orange and Benzoimidazolone Red, pyranthrone pigments such as Pyranthrone Red and Pyranthrone Orange, and other pigments such as thioindigo pigments, condensed azo pigments, Flavanthrone Yellow, Acylamide Yellow, Quinophtharone Yellow, Nickel Azo Yellow, Copper Azomethine Yellow, Perinone Orange, Anthrone Orange, Dianthraquinonyl Red and Dioxadine Violet.

In terms of the color index (C.I.) number, the following organic pigments can be listed. Obviously, conventionally known organic pigments other than the followings can be used.

C.I. pigment yellow: 12, 13, 14, 17, 20, 24, 74, 83, 86, 93, 109, 110, 117, 120, 125, 128, 137, 138, 147, 148, 151, 153, 154, 166, 168

C.I. pigment orange: 16, 36, 43, 51, 55, 59, 61

C.I. pigment red: 9, 48, 49, 52, 53, 57, 97, 122, 123, 149, 168, 175, 176, 177, 180, 192, 215, 216, 217, 220, 223, 224, 226, 227, 228, 238, 240

C.I. pigment violet: 19, 23, 29, 30, 37, 40, 50

C.I. pigment blue: 15, 15:1, 15:3, 15:4, 15:6, 22, 60, 64

C.I. pigment green: 7, 36

C.I. pigment brown: 23, 25, 26

Dispersant

When the above-mentioned carbon black and organic pigment are used, a dispersant may be used together. As such dispersant, one which can achieve stable dispersion of the above-mentioned pigment into an aqueous medium by the action of an anionic group is preferably used. Specific examples of the dispersant include a styrene-acrylic acid copolymer, a styrene-acrylic acid-acrylic acid alkyl ester copolymer, a styrene-maleic acid copolymer, a styrene-maleic acid-acrylic acid alkyl ester copolymer, a styrene-methacrylic acid copolymer, a styrene-methacrylic acid-acrylic acid alkyl ester copolymer, a styrene-maleic acid half-ester copolymer, a vinyl naphthalene-acrylic acid copolymer, a vinyl naphthalene-maleic acid copolymer, a styrene-maleic anhydride-maleic acid half-ester copolymer and a salt thereof. Of these dispersants, those having a weight average molecular weight in the range of 1,000 to 30,000 are preferable, and those having a weight average molecular weight in the range of 3,000 to 15,000 are particularly preferable.

Self-Dispersing Pigment

As a colorant, a pigment which is dispersible in an aqueous medium without a dispersant because of an ionic group (anionic group) bonded to the surface, so-called a self-dispersing pigment, may also be used. One example of such pigments is self-dispersing carbon black. Self-dispersing carbon black is, for example, anionic carbon black having anionic groups bonded to its surface.

Anionic Carbon Black

Examples of anionic carbon black are those having at least one anionic group selected from the group consisting of —COOM, —$SO_3M$, —$PO_3HM$ and —$PO_3M_2$ bonded to its surface. In the formulas, M represents a hydrogen atom, alkali metal, ammonium or organic ammonium. Of these, in particular, anionically charged carbon black having —COOM or —$SO_3M$ bonded to its surface is excellent in dispersibility in the ink, and therefore can be especially suitably used in the present invention.

Of those represented by "M" in the above hydrophilic groups, specific examples of alkali metals include Li, Na, K, Rb and Cs. In addition, specific examples of organic ammonium include methyl ammonium, dimethyl ammonium, trimethyl ammonium, ethyl ammonium, diethyl ammonium, triethyl ammonium, methanol ammonium, dimethanol ammonium and trimethanol ammonium.

The ink of the present invention containing self-dispersing carbon black in which M is ammonium or organic ammonium can further improve the water resistance of recorded images, and the ink is especially suitable in this respect. This seems to be because when the ink is applied on a recording medium, ammonium is decomposed and ammonia is evaporated. Self-dispersing carbon black in which M is ammonium is obtained, for example, by a method of replacing alkaline metal M of self-dispersing carbon black with ammonium by an ion exchange method, or by a method in which an acid is added to convert M into an H type, and then ammonium hydroxide is added to convert M into ammonium.

One example of the methods of producing anionic carbon black is a method in which carbon black is subjected to oxidation treatment with sodium hypochlorite. According to this method, a —COONa group can be chemically bonded to the surface of carbon black.

The above-described hydrophilic groups may be bonded directly to the surface of carbon black. Alternatively, the hydrophilic group may be bonded indirectly to the surface of carbon black with allowing another atomic group to be present between the surface of carbon black and the hydrophilic group. Here, specific examples of other atomic groups include a linear or branched alkylene group having 1 to 12 carbon atoms, a substituted or unsubstituted phenylene group and a substituted or unsubstituted naphthylene group. Examples of substituent of the phenylene group and the naphthylene group include a linear or branched alkyl group having 1 to 6 carbon atoms. In addition, specific examples of combination of other atomic groups and the hydrophilic group include —$C_2H_4$COOM, —Ph—$SO_3M$ and —Ph—COOM (Ph represents a phenylene group).

In the present invention, two or more of the above-mentioned examples of self-dispersing carbon black may be accordingly selected and used as a coloring material of the ink. The amount added of self-dispersing carbon black in the ink is preferably 0.1 mass % or more to 15 mass % or less, particularly preferably 1 mass % or more to 10 mass % or less based on the total amount of the ink. By setting the amount of self-dispersing carbon black to this range, the dispersion state of self-dispersing carbon black can be maintained well in the ink. Furthermore, for adjusting the color tone of the ink, a dye may be added as a coloring material in addition to self-dispersing carbon black.

Colored fine particles/micro-capsulated pigments

In addition to the coloring materials described above, pigments micro-capsulated with polymer or colored fine particles obtained by coating resin particles by a coloring material may be used. Although microcapsules themselves have dispersibility in an aqueous medium, a dispersant as described above may also be contained in the ink in order to improve dispersion stability. In addition, when colored fine particles are used as a coloring material, the above-mentioned anionic dispersant is preferably used.

(Aqueous Medium)

In the present invention, water or a mixed solvent of water and a water-soluble organic solvent may be accordingly used within the limit that the effect of the addition can be ensured and the objects and effects of the present invention are not damaged. Specific examples of the water-soluble organic solvent include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols; alkylene glycols of which alkylene group has 2 to 6 carbon atoms such as ethylene glycol, propylene glycol, butylene glycol, triethylene glycol, thiodiglycol, hexylene glycol and diethylene glycol; glycerol; lower alkyl ethers of polyhydric alcohols such as ethylene glycol monomethyl (or ethyl) ether, diethylene glycol methyl (or ethyl) ether and triethylene glycol monomethyl (or ethyl) ether; N-methyl-2-pyrrolidone, 2-pyrrolidone and 1,3-dimethyl-2-imidazolidinone. The water-soluble organic solvent listed above can be used alone or in the form of a mixture. Further, deionized water (ion-exchanged water) is preferably used as water.

(Other Components)

In addition to the above-mentioned components, a humectant may be added to the ink jet ink of the present invention according to need. Additionally, for desired property values, a viscosity modifier, a pH adjustor, a surfactant, a defoaming agent, a preservative, an anti-mold agent and an antioxidant may be added within the limit that the effect of the addition can be ensured and the objects and effects of the present invention are not damaged.

(Properties)

Suitable ranges of properties of the ink jet ink of the present invention are, at about 25° C., a pH of 3 to 12, preferably 7 to 10, a surface tension of 10 to 60 dyn/cm, preferably 10 to 40 dyn/cm, and a viscosity of 1 to 30 cps, preferably 1 to 5 cps.

[Ink Jet Recording Apparatus]

By using the ink jet ink of the present invention described above, curling phenomenon can be decreased or prevented and recording properties such as excellent ejection stability can be obtained when ink jet recording is conducted on a recording medium. The ink jet recording apparatus of the present invention comprises a recording unit provided with an ink container containing the above-mentioned ink and a head part for ejecting the ink, and an ink cartridge provided with the ink container containing the ink.

A recording apparatus suitable for conducting recording using the ink jet ink of the present invention is an apparatus which exerts thermal or mechanical energy corresponding to a recording signal to the ink within the recording head which has an ink container containing the ink, which energy generates ink droplets.

Figure 3:
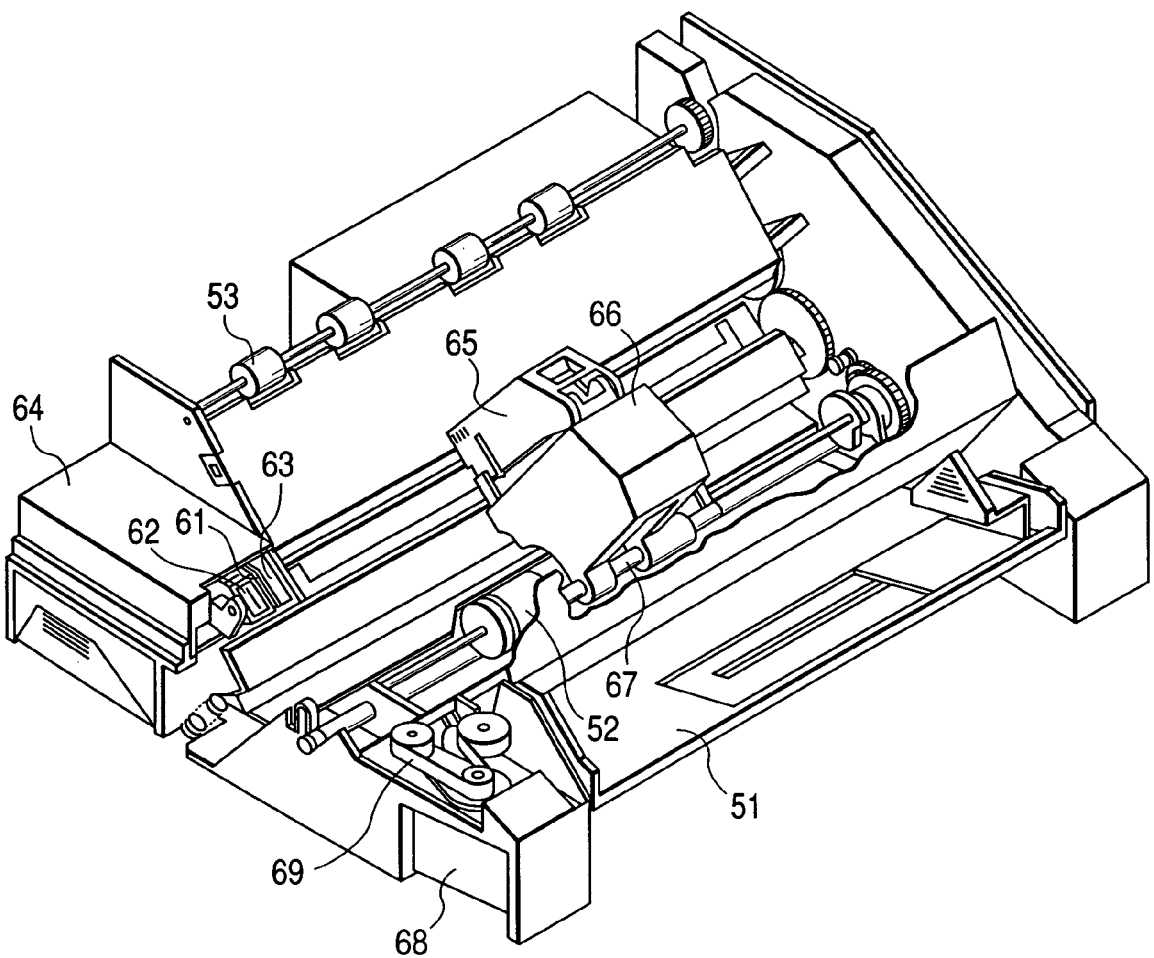
FIG. 3 is a perspective view illustrating an example of an ink jet recording apparatus.

FIG. 3 shows an example of the ink jet recording apparatus to which the above head is attached. In FIG. 3, reference numeral 61 denotes a blade which is a wiping member, and one end of the blade is supported and fixed by a blade supporting member to form a cantilever end. The blade 61 is placed at a position adjacent to the region where the recording head conducts recording, and in the example shown in FIG. 3, the blade 61 is held in such a manner that it protrudes into the path through which the recording head moves. Reference numeral 62 denotes a cap which is placed at a home position adjacent to the blade 61. The cap has a configuration such that it moves in the direction perpendicular to the moving direction of the recording head to cap the head when brought into contact with the ejection face. Reference numeral 63 in FIG. 3 denotes an ink-absorber provided adjacent to the blade 61, which is held in such a manner that it protrudes into the moving path of the recording head as the blade 61 does.

The above-mentioned blade 61, cap 62 and absorber 63 constitute an ejection recovery unit 64, and the blade 61 and the absorber 63 serve to remove moisture and dust on the ink ejection port face. Reference numeral 65 denotes a recording head which has means for generating ejecting energy and conducts recording by ejecting ink on a recording medium faced to the ejection port face having an ejection port. Reference numeral 66 denotes a carriage on which the recording head 65 is mounted to be carried. The carriage 66 is engaged with a guide shaft 67 in a slidable manner, and part of the carriage 66 is connected to a belt 69 driven by a motor 68. Thus the carriage 66 can move along the guide shaft 67, and the recording head 65 can move within the recording region and the region adjacent thereto.

Reference numeral 51 denotes a paper feeding part into which a recording medium is inserted and reference numeral 52 denotes a paper-feeding roller driven by a motor not shown in the figure. With such an arrangement, a recording medium is fed to the position facing the ink ejection port face of the recording head and as recording proceeds, the recording medium is delivered through a paper output unit provided with a paper output roller 53.

In the above arrangement, when the recording head 65 returns to its home position upon completion of recording, the cap 62 of the ejection recovery unit 64 recedes from the moving path of the recording head 65, but the blade 61 protrudes into the moving path. As a result, the ejection port face of the recording head 65 is wiped. When the cap 62 caps the recording head 65 upon contact with the ejection port face of the head, the cap 62 moves so as to protrude into the moving path of the recording head.

When the recording head 65 is moved from its home position to the position at which recording is started, the cap 62 and the blade 61 are at the same positions as the wiping position described above. As a result, the ejection port face of the recording head 65 is also wiped at the time of this movement. The above movement of the recording head to its home position is made not only when the recording is completed or ejection is recovered, but also when the recording head moves within the recording region for recording. The recording head moves to the home position adjacent to the recording region within a pre-determined distance and with this movement, the head is wiped as described above.

Figure 4:
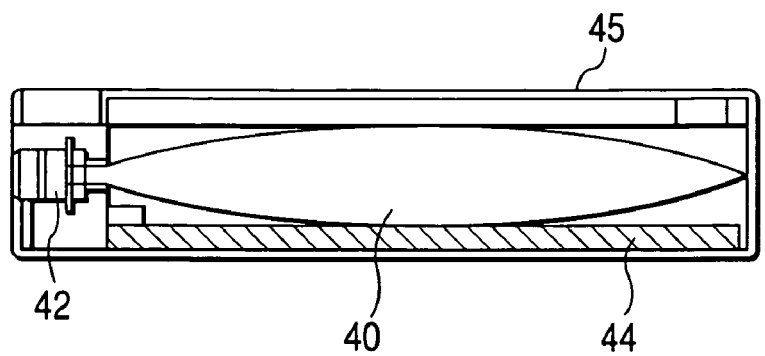
FIG. 4 is a vertical cross-sectional view of an ink cartridge.

FIG. 4 is a cross-sectional view illustrating an example of an ink cartridge 45 containing ink which is fed to a head via an ink supplying member such as a tube. In the figure, reference numeral 40 denotes an ink container containing ink to be supplied, for example, an ink bag, and a rubber stopper 42 is put on the tip. By inserting a needle (not shown in the figure) into the stopper 42, ink in the ink bag 40 can be fed to the head. Reference numeral 44 denotes an ink absorber for receiving waste ink.

Figure 5:
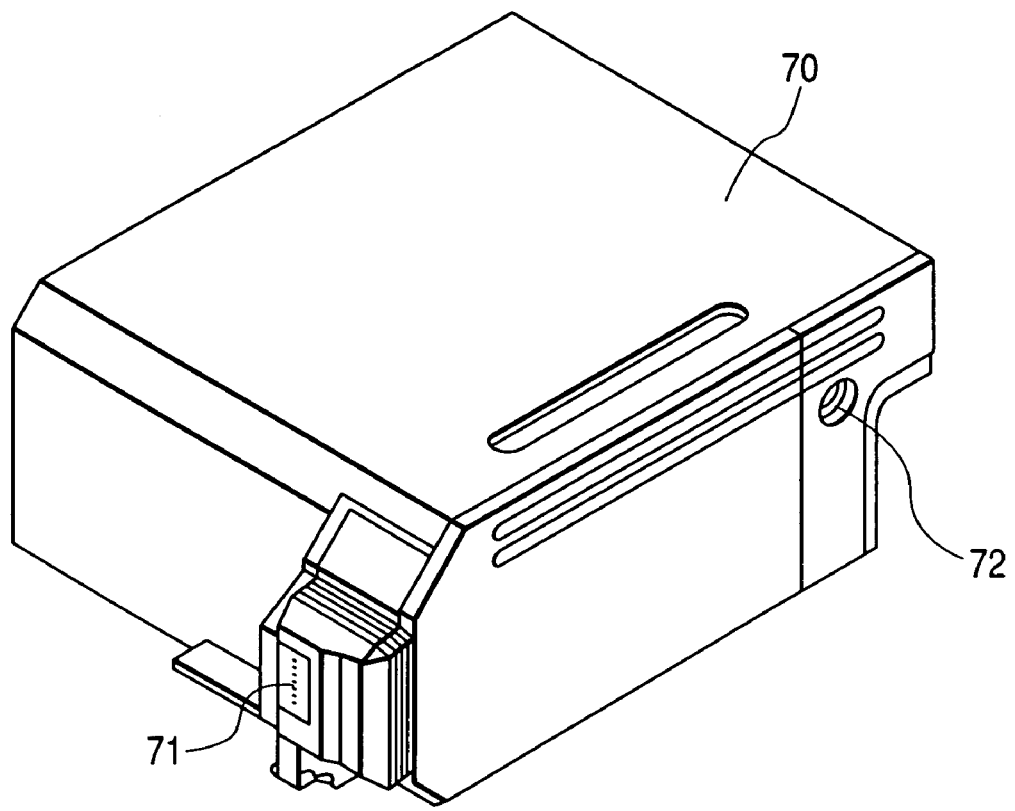
FIG. 5 is a perspective view of a recording unit.

The ink jet recording apparatus used in the present invention is not limited to those in which the head and the ink cartridge are separated as described above, but those in which they are integrally formed as shown in FIG. 5 can also be suitably used. In FIG. 5, reference numeral 70 denotes a recording unit which contains an ink container containing ink such as an ink absorber, and it is arranged so that ink contained in the ink absorber is ejected in the form of droplets through a head part 71 having a plurality of orifices. Reference numeral 72 denotes an air-communicating port for communicating the inside of the recording unit to air. The recording unit 70 is used in place of the recording head 65 shown in FIG. 3 and detachable from the carriage 66.

Figure 6:
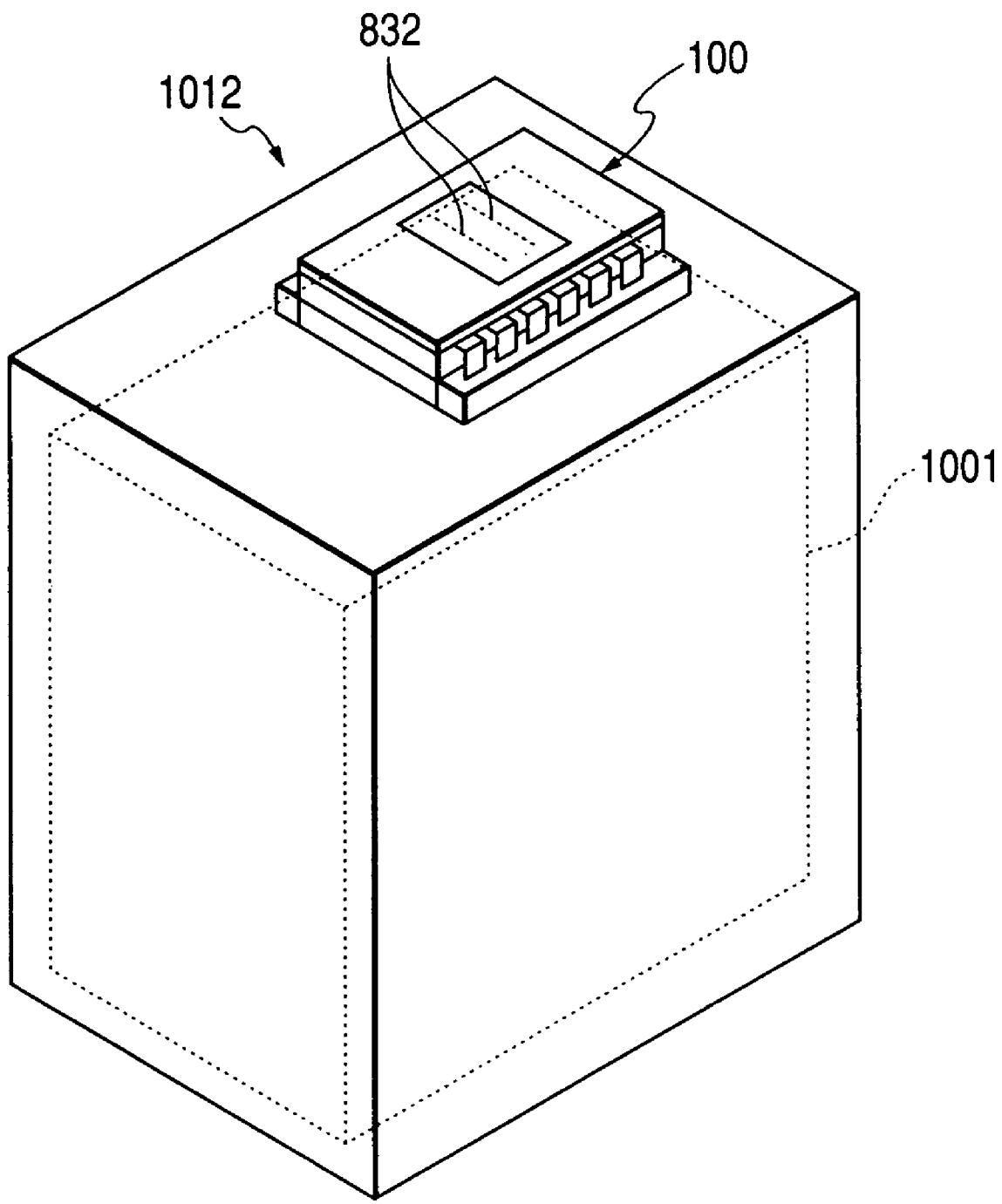
FIG. 6 is a schematic perspective view illustrating an example of an ink jet cartridge having a liquid ejection head.

FIG. 6 shows an example of an ink jet cartridge that can be attached to the above-mentioned ink jet recording apparatus. The cartridge 1012 in this example is of serial-type and an ink jet recording head 100 and a liquid tank 1001 for containing liquid such as ink constitute the main part. The ink jet recording head 100 has many ejection holes 832 for ejecting liquid, and liquid such as ink is introduced to a common liquid chamber of the liquid ejection head 100 from the liquid tank 1001 via a liquid supply channel which is not shown in the figure. The cartridge 1012 shown in FIG. 6 is designed so that the ink jet recording head 100 and the liquid tank 1001 are integrally formed to allow liquid to be supplied to the liquid tank 1001 according to need, but it is also possible to adopt a structure in which a liquid tank 1001 is interchangeably connected to the liquid ejection head 100.

EXAMPLES

Hereinafter, detailed explanation will be made by means of Examples and Comparative Examples, but the present invention is not limited to the following Examples as long as there is no departure from the subject of the present invention. In the following description, "part(s)" and "%" are based on mass unless otherwise noted.

Examples 1 to 10, Comparative Examples 1 to 4, Reference Example 1

(Preparation of Ink)

Components were mixed according to the following Table 1, sufficiently stirred, and the mixture was then filtered under pressure through a membrane filter having a pore size of 0.2 μm to prepare inks 1 to 10, comparative inks 1 to 4 and reference ink 1. The reference ink 1 contains only a water-soluble organic compound 1. Table 2 shows the data of X and Y, and X+Y and Y/X.

TABLE 1

| | | Difference between water retention abilities | Molecular weight Mw | Ink 1 | 2 | 3 | 4 | 5 | 6 | 7 | 8 | 9 | 10 |
|---|---|---|---|---|---|---|---|---|---|---|---|---|---|
| Compound 1 | Polyethylene glycol 200 | 36.0% | 200.0 | 5.0 | 7.0 | 6.0 | 7.0 | 7.0 | 10.0 | 10.0 | 10.0 | 7.0 | 7.0 |
| | Trimethylolpropane | 18.0% | 134.2 | 5.0 | 10.0 | 7.0 | 10.0 | 8.0 | | 5.0 | | 8.0 | 8.0 |
| | N,N'-bis-(2-hydroxyethyl)-urea | 27.4% | 148.2 | | | | | | 5.0 | | | | |
| | Bishydroxyethyl sulfone | 26.0% | 154.2 | | | | | | | | 5.0 | | |
| Compound 2 | Glycerol | 49.2% | 92.1 | 5.0 | 15.0 | 2.0 | 13.0 | 13.0 | 13.0 | 13.0 | 13.0 | 5.0 | 10.0 |
| Color material | C.I. acid yellow 23 | — | — | 3.0 | 3.0 | 3.0 | 3.0 | 3.0 | 3.0 | 3.0 | 3.0 | 3.0 | 3.0 |
| Additive | Acetylenol EH (*) | — | — | 1.0 | 1.0 | 1.0 | 1.0 | 1.0 | 1.0 | 1:0 | 1.0 | 1.0 | 1.0 |
| Water | Ion-exchanged water | — | — | 81.0 | 64.0 | 81.0 | 66.0 | 68.0 | 68.0 | 68.0 | 68.0 | 76.0 | 71.0 |

| | | Difference between water retention abilities | Molecular weight Mw | Comparative ink 1 | 2 | 3 | 4 | Reference ink 1 |
|---|---|---|---|---|---|---|---|---|
| Compound 1 | Polyethylene glycol 200 | 36.0% | 200.0 | 5.0 | 4.5 | 4.5 | 5.0 | 10.0 |
| | Trimethylolpropane | 18.0% | 134.2 | 5.0 | 4.5 | 4.5 | 5.0 | 10.0 |
| | N,N'-bis-(2-hydroxyethyl)-urea | 27.4% | 148.2 | | | | | |
| | Bishydroxyethyl sulfone | 26.0% | 154.2 | | | | | |
| Compound 2 | Glycerol | 49.2% | 92.1 | 10.0 | 5.0 | 8.0 | 2.0 | |
| Color material | C.I. acid yellow 23 | — | — | 3.0 | 3.0 | 3.0 | 3.0 | 3.0 |
| Additive | Acetylenol EH (*) | — | — | 1.0 | 1.0 | 1.0 | 1.0 | 1.0 |
| Water | Ion-exchanged water | — | — | 76.0 | 82.0 | 79.0 | 84.0 | 76.0 |

(*) Acetylene glycol-ethylene oxide adduct available from Kawaken Fine Chemicals Co., Ltd.

TABLE 2

| | | Ink | X [mass %] | Y [mass %] | X + Y [mass %] | Y/X | Water [mass %] |
|---|---|---|---|---|---|---|---|
| Example | 1 | Ink 1 | 10.0 | 5.0 | 15.0 | 0.50 | 81.0 |
| | 2 | Ink 2 | 17.0 | 15.0 | 32.0 | 0.88 | 64.0 |
| | 3 | Ink 3 | 13.0 | 2.0 | 15.0 | 0.15 | 81.0 |
| | 4 | Ink 4 | 17.0 | 13.0 | 30.0 | 0.76 | 66.0 |
| | 5 | Ink 5 | 15.0 | 13.0 | 28.0 | 0.87 | 68.0 |
| | 6 | Ink 6 | 15.0 | 13.0 | 28.0 | 0.87 | 68.0 |
| | 7 | Ink 7 | 15.0 | 13.0 | 28.0 | 0.87 | 68.0 |
| | 8 | Ink 8 | 15.0 | 13.0 | 28.0 | 0.87 | 68.0 |
| | 9 | Ink 9 | 15.0 | 5.0 | 20.0 | 0.33 | 76.0 |
| | 10 | Ink 10 | 15.0 | 10.0 | 25.0 | 0.67 | 71.0 |
| Comparative Example | 1 | Comparative ink 1 | 10.0 | 10.0 | 20.0 | 1.00 | 76.0 |
| | 2 | Comparative ink 2 | 9.0 | 5.0 | 14.0 | 0.56 | 82.0 |
| | 3 | Comparative ink 3 | 9.0 | 8.0 | 17.0 | 0.89 | 79.0 |
| | 4 | Comparative ink 4 | 10.0 | 2.0 | 12.0 | 0.20 | 84.0 |
| Reference Example | 1 | Reference ink 1 | 20.0 | 0.0 | 20.0 | 0.00 | 76.0 |

(Evaluation of Curling Phenomenon)

The obtained ink was applied to a recording method using an ink jet recording apparatus having an on-demand multi-recording head which ejects ink by applying thermal energy corresponding to a recording signal to the ink. The ink jet recording apparatus used had a structure shown in FIG. 3, and had an amount of ejection of 2.8 pL per dot, a recording density of 2400×1200 dpi. Referring to the driving condition, an apparatus having a drive frequency of 10 kHz was used and printing was conducted at a printing duty of 100%. For printing, 2-pass printing in which scanning in the printing region is conducted twice was employed. The recording media used were A4 size PPC paper (available from Canon Inc.). The recording conditions are the same in Examples, Comparative Examples and Reference Example.

Method of Evaluating Curling Phenomenon

The printed matter was left in an environment of a temperature of 24° C. and a humidity of 50% for 1 hour, 1 day, 4 days and 7 days and the extent of curling phenomenon over time was measured. Paper curled in the concave direction of paper was rated as + (positive curling phenomenon) and those curled in the convex direction as − (negative curling phenomenon). The distance from the top of the curled paper to the bottom plane of the paper was measured by a ruler. The criteria for evaluating curling phenomenon are as follow. The evaluation results are shown in Table 3. The criteria for evaluating curling phenomenon are as follow.

AA: within ±10 mm
A: greater than ±10 mm, within ±25 mm

B: greater than ±25 mm, within ±40 mm
C: side of paper warped inwardly
D: side of paper curled up inwardly (Evaluation of Ejection Stability)

The obtained ink was applied to a recording medium using an ink-jet recording apparatus having an on-demand multi-recording head which ejects ink by applying thermal energy corresponding to a recording signal to the ink. The ink jet recording apparatus used had a structure shown in FIG. 3, and had an amount of ejection of 2.8 pL per dot, a recording density of 2400×1200 dpi. Referring to the driving condition, an apparatus having a drive frequency of 100 kHz was used and printing was conducted at a printing duty of 100%. For printing, 2-pass printing in which scanning in the printing region is conducted twice was employed. The recording media used were A4 size PPC paper (available from Canon Inc.). These recording conditions are the same throughout Examples, Comparative Examples and Reference Example.

A: no blurring
B: little blurring observed, but practically no problem
C: blurring observed, images have problems
D: no ejection sometimes observed

[Method of Evaluating Ejection Stability 2 (Start-Up Characteristic)]

For evaluating ejection stability of ink, occurrence of unstable or blurred printing of initial portions at the beginning of printing was observed in environment 1: normal temperature, normal humidity and environment 2: temperature 15° C., humidity 10%. The criteria for evaluating ejection stability 2 (start-up characteristic) are as follows. The evaluation results are shown in Table 3.

A: no blurring
B: no blurring, images slightly unstable, but practically no problem
C: initial portion blurred, images have problems
D: initial portion greatly blurred

TABLE 3

|  |  | Ink | Curling phenomenon | | | | Ejection stability 1 | Ejection stability 2 | |
|---|---|---|---|---|---|---|---|---|---|
|  |  |  | 1 hour | 1 day | 4 days | 7 days |  | Environment 1 | Environment 2 |
| Example | 1 | Ink 1 | A | A | B | C | B | B | D |
|  | 2 | Ink 2 | AA | AA | B | C | B | B | D |
|  | 3 | Ink 3 | A | A | A | A | B | B | D |
|  | 4 | Ink 4 | AA | AA | A | B | B | B | D |
|  | 5 | Ink 5 | AA | AA | A | B | B | B | D |
|  | 6 | Ink 6 | AA | AA | A | B | B | B | C |
|  | 7 | Ink 7 | AA | AA | A | B | B | B | D |
|  | 8 | Ink 8 | AA | AA | A | B | B | B | C |
|  | 9 | Ink 9 | A | A | A | A | B | B | C |
|  | 10 | Ink 10 | AA | AA | A | B | B | B | D |
| Comparative | 1 | Comparative ink 1 | B | C | C | D | B | B | D |
| Example | 2 | Comparative ink 2 | B | B | C | C | B | B | D |
|  | 3 | Comparative ink 3 | B | B | C | D | B | B | D |
|  | 4 | Comparative ink 4 | B | B | B | B | B | B | D |
| Reference Example | 1 | Reference ink 1 | AA | AA | A | A | D | B | D |

Method of Evaluating Ejection Stability 1 (Ejection Stability after Leaving Head)

For evaluating ejection stability of ink, occurrence of problems such as nozzle clogging was observed by confirming whether unstable printing or blurring of images occurred when printed after the above-mentioned ink was set to the head and left for 1 month. The criteria for evaluating ejection stability 1 (ejection stability after leaving head) are as follows. The evaluation results are shown in Table 3.

Examples 11 to 19, Comparative Examples 5 and 6

(Preparation of Ink)

Components were mixed according to the following Table 4, sufficiently stirred, and the mixture was then filtered under pressure through a membrane filter having a pore size of 0.2 µm to prepare inks 11 to 19 and comparative inks 5 and 6. Table 5 shows the data of $X_1$, $X_2$, $Y_1$, and $X_1+X_2$, $X_2+Y_1$, $X_1+X_2+Y_1$, $Y_1/(X_1+X_2)$ and $(X_2+Y_1)/X_1$.

TABLE 4

|  |  | Difference between water retention abilities | Molecular weight | Ink | | | | | | | | | Comparative ink | |
|---|---|---|---|---|---|---|---|---|---|---|---|---|---|---|
|  |  |  |  | 11 | 12 | 13 | 14 | 15 | 16 | 17 | 18 | 19 | 5 | 6 |
| Compound 1-1 | Polyethylene glycol 200 | 36.0% | 200.0 |  |  | 7.0 | 6.0 | 6.0 | 3.0 | 3.0 | 3.0 | 5.0 | 2.5 | 6.0 |
|  | Trimethylolpropane | 18.0% | 134.2 |  |  | 7.0 | 6.0 | 6.0 | 7.0 | 3.0 | 3.0 | 3.0 | 2.5 | 6.0 |
|  | 1,2,6-hexanetriol | 26.3% | 134.2 |  |  | 3.0 |  |  |  |  |  |  |  |  |
|  | Polyethylene glycol 300 | 32.2% | 300.0 | 4.5 | 4.5 |  |  |  |  |  |  |  |  |  |
|  | N,N'-bis-(2-hydroxyethyl)-urea | 27.4% | 148.2 |  |  |  |  |  |  | 4.0 |  |  |  |  |

TABLE 4-continued

| | | Difference between water retention abilities | Molecular weight | Ink 11 | 12 | 13 | 14 | 15 | 16 | 17 | 18 | 19 | Comparative ink 5 | 6 |
|---|---|---|---|---|---|---|---|---|---|---|---|---|---|---|
| | Bishydroxyethyl sulfone | 26.0% | 154.2 | | | | | | | | 4.0 | | | |
| Compound 1-2 | 1,5-pentanediol | 19.2% | 104.2 | | 1.0 | 1.0 | | | | | | | | |
| | 1,6-hexanediol | 9.6% | 118.2 | 5.5 | 6.0 | | 5.0 | 5.0 | 7.0 | 7.0 | 7.0 | 9.0 | 30 | |
| Compound 2-1 | Ethylene glycol | 60.6% | 62.1 | | | | 4.0 | 2.0 | | | | | | |
| | Glycerol | 49.2% | 92.1 | 5.0 | 4.0 | 2.0 | 5.0 | 5.0 | 3.0 | 3.0 | 3.0 | 3.0 | 10.0 | 1.0 |
| | Ethylene urea | 52.4% | 86.1 | | | | 6.0 | 6.0 | | | | 5.0 | | |
| Color material | C.I. direct blue 199 | — | — | 5.0 | 5.0 | 5.0 | 5.0 | 5.0 | 5.0 | 5.0 | 5.0 | | 5.0 | 5.0 |
| | C.I. acid yellow 23 | — | — | | | | | | | | | 3.0 | | |
| Additive | Acetylenol EH (*) | — | — | 1.0 | 1.0 | 1.0 | 1.0 | 1.0 | 1.0 | 1.0 | 1.0 | 1.0 | 1.0 | 1.0 |
| Water | Ion-exchanged water | — | — | 79.0 | 78.5 | 74.0 | 62.0 | 64.0 | 74.0 | 74.0 | 74.0 | 71.0 | 76.0 | 81.0 |

(*) Acetylene glycol-ethylene oxide adduct available from Kawaken Fine Chemicals Co., Ltd.

TABLE 5

| | | Ink | $X_1$ [mass %] | $X_2$ [mass %] | $X_1 + X_2$ [mass %] | $Y_1$ [mass %] | $X_2 + Y_1$ [mass %] | $X_1 + X_2 + Y_1$ [mass %] | Water [mass %] | $Y_1/(X_1 + X_2)$ | $(X_2 + Y_1)/X_1$ |
|---|---|---|---|---|---|---|---|---|---|---|---|
| Example | 11 | Ink 11 | 4.5 | 5.5 | 10.0 | 5.0 | 10.5 | 15.0 | 79.0 | 0.50 | 2.33 |
| | 12 | Ink 12 | 4.5 | 7.0 | 11.5 | 4.0 | 11.0 | 15.5 | 78.5 | 0.35 | 2.44 |
| | 13 | Ink 13 | 17.0 | 1.0 | 18.0 | 2.0 | 3.0 | 20.0 | 74.0 | 0.11 | 0.18 |
| | 14 | Ink 14 | 12.0 | 5.0 | 17.0 | 15.0 | 20.0 | 32.0 | 62.0 | 0.88 | 1.67 |
| | 15 | Ink 15 | 12.0 | 5.0 | 17.0 | 13.0 | 18.0 | 30.0 | 64.0 | 0.76 | 1.50 |
| | 16 | Ink 16 | 10.0 | 7.0 | 17.0 | 3.0 | 10.0 | 20.0 | 74.0 | 0.18 | 1.00 |
| | 17 | Ink 17 | 10.0 | 7.0 | 17.0 | 3.0 | 10.0 | 20.0 | 74.0 | 0.18 | 1.00 |
| | 18 | Ink 18 | 10.0 | 7.0 | 17.0 | 3.0 | 10.0 | 20.0 | 74.0 | 0.18 | 1.00 |
| | 19 | Ink 19 | 8.0 | 9.0 | 17.0 | 8.0 | 17.0 | 25.0 | 71.0 | 0.47 | 2.13 |
| Comparative Example | 5 | Comparative ink 5 | 5.0 | 3.0 | 8.0 | 10.0 | 13.0 | 18.0 | 76.0 | 1.25 | 2.60 |
| | 6 | Comparative ink 6 | 12.0 | 0.0 | 12.0 | 1.0 | 1.0 | 13.0 | 81.0 | 0.08 | 0.08 |

(Evaluation of Curling Phenomenon)

The method of evaluating curling phenomenon is as described above. The evaluation results are shown in Table 6.

(Evaluation of Ejection Stability)

The method of evaluating ejection stability 1 (ejection stability after leaving head) and the method of evaluating ejection stability 2 (start-up characteristic) are as described above. The evaluation results are shown in Table 6.

This application claims priority from Japanese Patent Application No. 2004-075391 filed on Mar. 16, 2004, Japanese Patent Application No. 2004-075392 filed on Mar. 16, 2004, Japanese Patent Application No. 2004-289652 filed on Oct. 1, 2004 and Japanese Patent Application No. 2005-072040 filed on Mar. 14, 2005, which are hereby incorporated by reference herein.

What is claimed is:

1. Ink jet ink comprising at least water, a colorant, a water-soluble organic compound 1 and a water-soluble organic compound 2,

TABLE 6

| | | Ink | Curling phenomenon | | | | Ejection stability 1 | Ejection stability 2 | |
|---|---|---|---|---|---|---|---|---|---|
| | | | 1 hour | 1 day | 4 days | 7 days | | Environment 1 | Environment 2 |
| Example | 11 | Ink 11 | AA | A | B | C | A | A | B |
| | 12 | Ink 12 | AA | A | B | C | A | A | B |
| | 13 | ink 13 | AA | A | A | A | B | B | C |
| | 14 | Ink 14 | AA | AA | A | C | A | B | C |
| | 15 | Ink 15 | AA | AA | A | B | A | A | B |
| | 16 | Ink 16 | AA | A | A | A | B | A | B |
| | 17 | Ink 17 | AA | A | A | A | A | A | A |
| | 18 | Ink 18 | AA | A | A | A | A | A | A |
| | 19 | Ink 19 | AA | AA | A | B | A | A | B |
| Comparative Example | 5 | Comparative ink 5 | B | B | C | D | A | B | C |
| | 6 | Comparative ink 6 | B | B | B | B | C | B | D | wherein a viscosity of the ink jet ink is 1 to 5 cps at 25° C., the water content (%) is 77 mass % or less based on the total amount of the ink jet ink, the content Y(%) of the water-soluble organic compound 2 is Y<15 mass %, and the content X(%) of the water-soluble organic compound 1 is 10 mass % or more based on the total amount of the ink jet ink and the content X(%) of the water-soluble organic compound 1 and the content Y(%) of the water-soluble organic compound 2 based on the total amount of the ink jet ink satisfy the relation of the following formula (I) and formula (II):

$$0.15 \leq Y/X \leq 0.9, \quad (I)$$

$$X+Y \geq 15 \text{ mass \%}, \quad (II)$$

and wherein the water-soluble organic compound 1 is a water-retentive, water-soluble organic compound having a difference between the water retention ability in an environment of a temperature of 23° C. and a humidity of 45% and the water retention ability in an environment of a temperature of 30° C. and a humidity of 80% of 36% or less, and the water-soluble organic compound 2 is a water-soluble organic compound other than the colorant and the water-soluble organic compound 1.

2. The ink jet ink according to claim 1, wherein the water-soluble organic compound 1 is a polyhydric alcohol having an amide bond.

3. The ink jet ink according to claim 1 or 2, wherein the water-soluble organic compound 1 is a polyhydric alcohol having a sulfone group.

4. The ink jet ink according to claim 1, wherein the sum X+Y of the contents of the water-soluble organic compound 1 and the water-soluble organic compound 2 is X+Y≧20 mass % based on the total amount of the ink jet ink.

5. The ink jet ink according to claim 4, wherein the X+Y is X+Y≧25 mass %.

6. The ink jet ink according to claim 1, wherein the water content (%) is 71 mass % or less.

7. The ink jet ink according to claim 1, wherein the difference between water retention abilities is 40% or more.

8. Ink jet ink comprising at least water and a colorant, and further comprising a water-soluble organic compound 1-1, a water-soluble organic compound 1-2, and a water-soluble organic compound 2-1, wherein the content $X_1$(%) of the water-soluble organic compound 1-1 based on the total amount of the ink jet ink, the content $X_2$(%) of the water-soluble organic compound 1-2 based on the total amount of the ink jet ink and the content $Y_1$(%) of the water-soluble organic compound 2-1 based on the total amount of the ink jet ink satisfy the relation of the following formulae (1) to (3):

$$0.1 \leq (X_2+Y_1)/X_1 \leq 2.5, \quad (1)$$

$$X_1+X_2 \geq 10 \text{ mass \%}, \quad (2)$$

$$X_2, Y_1 \geq 3 \text{ mass \%} \quad (3)$$

and wherein the water-soluble organic compound 1-1 is a water-soluble polyhydric alcohol or water-soluble amide compound having a difference between the water retention ability in an environment of a temperature of 23° C. and a humidity of 45% and the water retention ability in an environment of a temperature of 30° C. and a humidity of 80% of 36% or less, and a molecular weight Mw in the range of 100 Mw 1000, the water-soluble organic compound 1-2 is a water-soluble alkanediol having a difference between a water retention ability in an environment of a temperature of 23° C. and a humidity of 45% and a water retention ability in an environment of a temperature of 30° C. and a humidity of 80% of 36% or less, and a molecular weight Mw in the range of 100≦ Mw ≦150, the alkanediol further containing an —OH group at both terminals of a main chain, and the water-soluble organic compound 2-1 is a water-soluble organic compound other than the colorant, the water-soluble organic compound 1-1 and the water-soluble organic compound 1-2.

9. The ink jet ink according to claim 8, wherein the water-soluble organic compound 1-1 is a polyhydric alcohol having an amide bond.

10. The ink jet ink according to claim 8, wherein the water-soluble organic compound 1-1 is a polyhydric alcohol having a sulfone group.

11. The ink jet ink according to claim 8, wherein the sum $X_1+X_2+Y_1$ of the contents of the water-soluble organic compound 1-1, the water-soluble organic compound 1-2 and the water-soluble organic compound 2-1 is $X_1+X_2+Y_1 \geq 20$ mass % based on the total amount of the ink jet ink.

12. The ink jet ink according to claim 11, wherein the $X_1+X_2+Y_1$ is $X_1+X_2+Y_1 \geq 25$ mass %.

13. The ink jet ink according to claim 8, wherein the content $X_1$(%) of the water-soluble organic compound 1-1, the content $X_2$(%) of the water-soluble organic compound 1-2 and the content $Y_1$(%) of the water-soluble organic compound 2-1 further satisfy the relation of the following formula (4):

$$0 < Y_1/(X_1+X_2) \leq 0.9. \quad (4)$$

14. The ink jet ink according to claim 8, wherein the water content (%) is 77 mass % or less based on the total amount of the ink jet ink.

15. The ink jet ink according to claim 14, wherein the water content (%) is 71 mass % or less.

16. The ink jet ink according to claim 8, wherein the content $Y_1$(%) of the water-soluble organic compound 2-1 is $Y_1 < 15$ mass % and the difference between water retention abilities is 40% or more.

17. An ink jet recording method which comprises applying the ink jet ink according to claim 1 or 8 to a recording medium by an ink jet head to form an image.

18. An ink cartridge containing the ink jet ink according to claim 1 or 9.

19. An ink jet recording apparatus equipped with the ink jet ink according to claim 1 or 9.

20. The ink jet ink according to claim 1, wherein the water-soluble organic compound 1 is at least one selected from the group consisting of polyethylene glycols having an average molecular weight of 200, 300, 400, 600 and 1000, 1,2,6-hexanetriol, trimethyloipropane, trimethylolethane, pentaerytbritol, diglycerol, glucose, sorbitol, bishydroxyethyl sulfone, N,N'-bis-(2-hydroxyethyl)-urea, tetra-(2-hydroxyethyl)-phenyldiamide, 1,5-pentanediol, 1,6-hexanediol, 1,7-heptanediol, 3-methyl -1,5-pentanediol, 2-amino-2-methyl-1,3-propanediol and 2-amino-2-ethyl-1, 3-propanediol.

21. The ink jet ink according to claim 1, wherein the water-soluble organic compound 2 is at least one selected from the group consisting of urea, ethylene glycol, 2-pyrrolidone, ethylene urea, glycerol and diethylene glycol.

22. The ink jet ink according to claim 1, wherein the water-soluble organic compound 2 is at least glycerol.

23. The ink jet ink according to claim 1, wherein the water-soluble organic compound 1 is at least one selected from the group consisting of polyethylene glycols having an average molecular weight of 200, 300, 400, 600 and 1000, 1,2,6-hexanetriol, trimethylolpropane, trimethylolethane, pentaerythritol, diglycerol, glucose, sorbitol, bishydroxyethyl sulfone, N,N'-bis-(2-hydroxyethyl)-urea, tetra-(2-hydroxyethyl)-phenyldiamide, 1,5-pentanediol, 1,6-hexanediol, 1,7-heptanediol, 3-methyl -1,5-pentanediol, 2-amino-2-methyl-1,3-propanediol and 2-amino-2-ethyl-1,3-propanediol, and wherein the water-soluble organic compound 2 is at least one selected from the group consisting of urea, ethylene glycol, 2-pyrrolidone, ethylene urea, glycerol and diethylene glycol.

24. The ink jet ink according to claim 8, wherein the water-soluble organic compound 1-1 is at least one selected from the group consisting of polyethylene glycols having an average molecular weight of 200, 300, 400, 600, 1000, 1,2,6-hexanetriol, trimethylolpropane, trimethylolethane, pentaerythritol, diglycerol, glucose, sorbitol, bishydroxyethyl sulfone, N,N'-bis-(2-hydroxyethyl)-urea and tetra-(2-hydroxyethyl)-phenyldiamide.

25. The ink jet ink according to claim 8, wherein the water-soluble organic compound 1-2 is at least one selected from the group consisting of 1,5-pentanediol, 1,6-hexanediol, 1,7-heptanediol, 3-methyl-1,5-pentanediol, 2-amino-2-methyl-1,3-propanediol and 2-amino-2-ethyl-1,3-propanediol.

26. The ink jet ink according to claim 8, wherein the water-soluble organic compound 2-1 is at least one selected from the group consisting of urea, ethylene glycol, 2-pyrrolidone, ethylene urea, glycerol and diethylene glycol.

27. The ink jet ink according to claim 8, wherein the water-soluble organic compound 1-1 is at least one selected from the group consisting of polyethylene glycols having an average molecular weight of 200, 300, 400, 600, 1000, 1,2,6-hexanetriol, trimethylolpropane, trimethylolethane, pentaerythritol, diglycerol, glucose, sorbitol, bishydroxyethyl sulfone, N,N'-bis-(2-hydroxyethyl)-urea and tetra-(2-hydroxyethyl)-phenyldiamide, and wherein the water-soluble organic compound 1-2 is at least one selected from the group consisting of 1,5-pentanediol, 1,6-hexanediol, 1,7-heptanediol, 3-methyl-1,5-pentanediol, 2-amino-2-methyl-1,3-propanediol and 2-amino-2-ethyl-1,3-propanediol, and wherein the water-soluble organic compound 2-1 is at least one selected from the group consisting of urea, ethylene glycol, 2-pyrrolidone, ethylene urea, glycerol and diethylene glycol.

28. Ink jet ink comprising at least water, a colorant, a water-soluble organic compound 1 and a water-soluble organic compound 2, wherein a viscosity of the ink jet ink is 1 to 5 cps at 25° C., and the water content (%) is 77 mass % or less based on the total amount of the ink jet ink, and the content Y(%) of the water-soluble organic compound 2 is Y<15 mass %, and the water-soluble organic compound 2 comprises at least glycerol, and the content X(%) of the water-soluble organic compound 1 is 10 mass % or more based on the total amount of the ink jet ink and the content X(%) of the water-soluble organic compound 1 and the content Y(%) of the water-soluble organic compound 2 based on the total amount of the ink jet ink satisfy the relation of the following formula (I) and formula (II):

$$0.15 \leq Y/X \leq 0.9, \quad (I)$$

$$X+Y \geq 15 \text{ mass \%}, \quad (II)$$

and wherein the water-soluble organic compound 1 is a water-retentive, water-soluble organic compound having a difference between the water retention ability in an environment of a temperature of 23° C. and a humidity of 45% and the water retention ability in an environment of a temperature of 30° C. and a humidity of 80% of 36% or less, and the water-soluble organic compound 2 is a water-soluble organic compound other than the colorant and the water-soluble organic compound 1.

* * * * *

UNITED STATES PATENT AND TRADEMARK OFFICE
CERTIFICATE OF CORRECTION

PATENT NO.        : 7,297,194 B2
APPLICATION NO.   : 11/219807
DATED             : November 20, 2007
INVENTOR(S)       : Kenji Shinjo et al.

It is certified that error appears in the above-identified patent and that said Letters Patent is hereby corrected as shown below:

ON THE TITLE PAGE, At (56) References Cited, U.S. PATENT DOCUMENTS:
"2006/0007280 A1" should read --2006/0007289 A1--.

COLUMN 1:
Line 20, "according" should read --according to--.
Line 25, "addition," should read --addition, a--.

COLUMN 2:
Line 30, "at a" should read --at an--.
Line 39, "ink, a" should read --ink, an-- and "and a" should read --and an--.

COLUMN 4:
Line 61, "detail" should read --detailed--.

COLUMN 6:
Line 38, "has" should read --have--.

COLUMN 7:
Line 1, "compound" should read --compound 1--.
Line 3, "compound and" should read --compound 1 and-- and
        "compound is" should read --compound 2 is--.
Line 39, "compound" should read --compound 2--.
Line 44, "compound causes" should read --compound 2 causes--.
Line 49, "compound" should read --compound 2--.
Line 55, "compound and" should read --compound 1 and--.

COLUMN 10:
Line 66, "<11" should read --$\leq 11$--.

UNITED STATES PATENT AND TRADEMARK OFFICE
CERTIFICATE OF CORRECTION

PATENT NO. : 7,297,194 B2
APPLICATION NO. : 11/219807
DATED : November 20, 2007
INVENTOR(S) : Kenji Shinjo et al.

It is certified that error appears in the above-identified patent and that said Letters Patent is hereby corrected as shown below:

COLUMN 11:
Line 16, "compound or" should read --compound 1 or--.

COLUMN 12:
Line 22, "compound" should read --compound 1--.
Line 52, "followings." should read --following.--.

COLUMN 13:
Line 28, "followings" should read --following--.

COLUMN 14:
Line 34, "followings" should read --following--.

COLUMN 20:
Line 63, "follow." should read --follows.--
Line 65, "low." should read --lows.--.

COLUMN 26:
Line 2, "100 Mw 1000," should read --$100 \leq Mw \leq 1000$,--.
Line 50, "9." should read --8.--.
Line 52, "9." should read --8.--.
Line 57, "trimethyloipropane," should read --trimethylolpropane,--.
Line 58, "pentaerytbritol" should read --pentaerythritol--.

Signed and Sealed this

Second Day of December, 2008

JON W. DUDAS
*Director of the United States Patent and Trademark Office*